(12) United States Patent
Itoh

(10) Patent No.: US 6,700,558 B1
(45) Date of Patent: Mar. 2, 2004

(54) LIQUID CRYSTAL DISPLAY DEVICE AND DISPLAYING METHOD THEREOF

(75) Inventor: Nobuyuki Itoh, Noda (JP)

(73) Assignee: Sharp Kabushiki Kaisha, Osaka (JP)

(*) Notice: Subject to any disclaimer, the term of this patent is extended or adjusted under 35 U.S.C. 154(b) by 401 days.

(21) Appl. No.: 09/667,679

(22) Filed: Sep. 22, 2000

(30) Foreign Application Priority Data

| | | |
|---|---|---|
| Sep. 24, 1999 | (JP) | 11-269747 |
| Sep. 29, 1999 | (JP) | 11-275635 |
| Nov. 19, 1999 | (JP) | 11-329182 |
| Aug. 10, 2000 | (JP) | 2000-243374 |

(51) Int. Cl.$^7$ .................................................. G09G 3/36

(52) U.S. Cl. ........................... 345/87; 345/58; 349/141

(58) Field of Search ..................... 345/87, 88, 89–104, 345/58; 349/42, 49, 139, 141

(56) References Cited

U.S. PATENT DOCUMENTS

| | | | |
|---|---|---|---|
| 5,847,793 A | | 12/1998 | Itoh |
| 5,999,155 A | * | 12/1999 | Satou ........................... 345/93 |
| 6,049,365 A | * | 4/2000 | Nakashima ................... 349/42 |

(List continued on next page.)

FOREIGN PATENT DOCUMENTS

| | | |
|---|---|---|
| JP | 62239127 | 10/1987 |
| JP | 62239128 | 10/1987 |
| JP | 6222397 | 8/1994 |
| JP | 85990 | 1/1996 |
| JP | 862586 | 3/1996 |
| JP | 9258245 | 10/1997 |

OTHER PUBLICATIONS

N. Itoh et al., "17" Video–Rate Full–Color FLCD, Proceedings of the Fifth International Display Workshops, Dec. 7–9, 1998, pp. 205–208.
Noel A. Clark et al., "Submicrosecond bistable electro–optic switching in liquid crystals", Appl. Phys. Letter 36(11), Jun. 1, 1980, pp. 899–901.
T. Miyashita et al., "Wide viewing angle display mode for active matrix LCD using bend alignment liquid crystal cell", The 13$^{th}$ International Display Research Conference, Aug. 31–Sep. 3, 1993, pp. 149–152.

(List continued on next page.)

Primary Examiner—Steven Saras
Assistant Examiner—Fritz Alphonse
(74) Attorney, Agent, or Firm—Birch, Stewart, Kolasch & Birch, LLP

(57) ABSTRACT

A switching electrode connected to a switching element is provided on a first substrate. An opposing electrode, an insulation film, and a plurality of sub electrodes are provided on a second substrate. Moreover, a resistant film is provided on a first substrate. A switching electrode which is connected to the switching element and an electrode which is not connected to the switching element are provided on the resistant film. An opposing electrode which is not connected to the switching element is provided on the second substrate. Furthermore, a first electrode which is connected to a first switching element and a third electrode which is not connected to the switching element are provided on the first substrate. The first and third electrodes are opposed to the second electrode, which is connected to a second switching element, via an insulator. The opposing electrode which is not connected to the switching element is provided on the second substrate. Thus, a liquid crystal display device can achieve fast response and even display without a blurred moving image.

17 Claims, 21 Drawing Sheets

U.S. PATENT DOCUMENTS

| | | | | |
|---|---|---|---|---|
| 6,078,376 | A | * | 6/2000 | Takeda et al. ............... 349/139 |
| 6,104,463 | A | * | 8/2000 | Shibahara ................... 349/141 |
| 6,111,627 | A | * | 8/2000 | Kim et al. ................... 349/141 |
| 6,141,078 | A | * | 10/2000 | Morii et al. ................. 349/155 |
| 6,191,837 | B1 | * | 2/2001 | Fujimaki et al. ............ 349/141 |
| 6,281,957 | B1 | * | 8/2001 | Oh et al. .................... 349/141 |
| 6,285,428 | B1 | * | 9/2001 | Kim et al. ................... 349/141 |
| 6,421,039 | B1 | * | 7/2002 | Moon et al. ................. 345/100 |
| 6,452,656 | B2 | * | 9/2002 | Niwano et al. ............. 349/141 |
| 6,529,256 | B1 | * | 3/2003 | Seo ............................ 349/141 |
| 6,535,188 | B1 | * | 3/2003 | Morimoto ................... 345/87 |

OTHER PUBLICATIONS

D. J. Channin et al., "Rapid turn–off in triode optical gate liquid crystal devices", Appl. Phys. Letter vol. 28, No. 6, Mar. 15, 1976, pp. 300–302.

S. Shiotsu et al., "23. A basic study of a liquid crystal light bulb using comb electrodes", Proceedings of Meeting at Shin–etsu branch of Society for Electronic Information and Communication, 1987 (With translation).

Y. Kurita, "A display system of hold–type display and an image quality of the same when displaying motion picture", Preliminary texts for the first LCD forum, 1998, pp. 1–6 (with translation).

T. Miyashita et al., "Field–sequential full–color liquid crystal display utilizing a high–speed response characteristic of an OCB liquid crystal", Preliminary texts for the first LCD forum, 1998, pp. 7–11 (with translation).

* cited by examiner

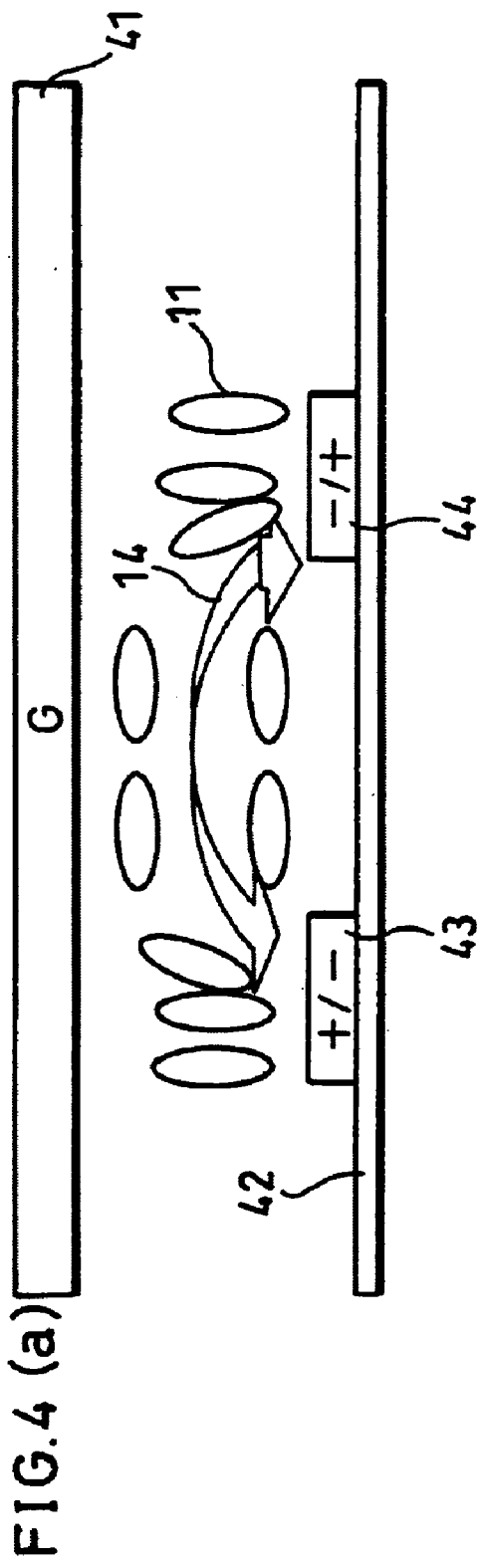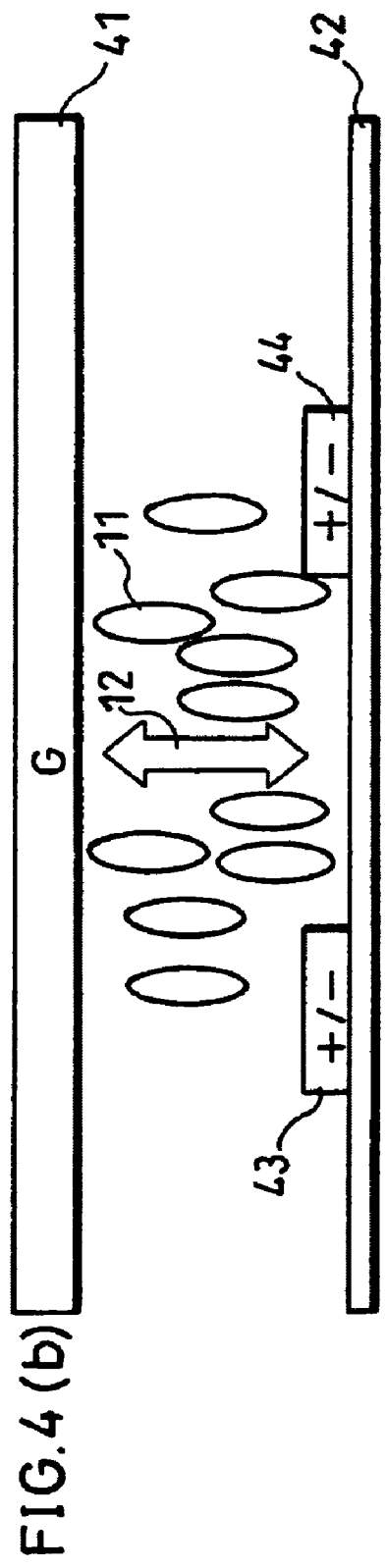
FIG.4 (a)   FIG.4 (b)

FIG. 17
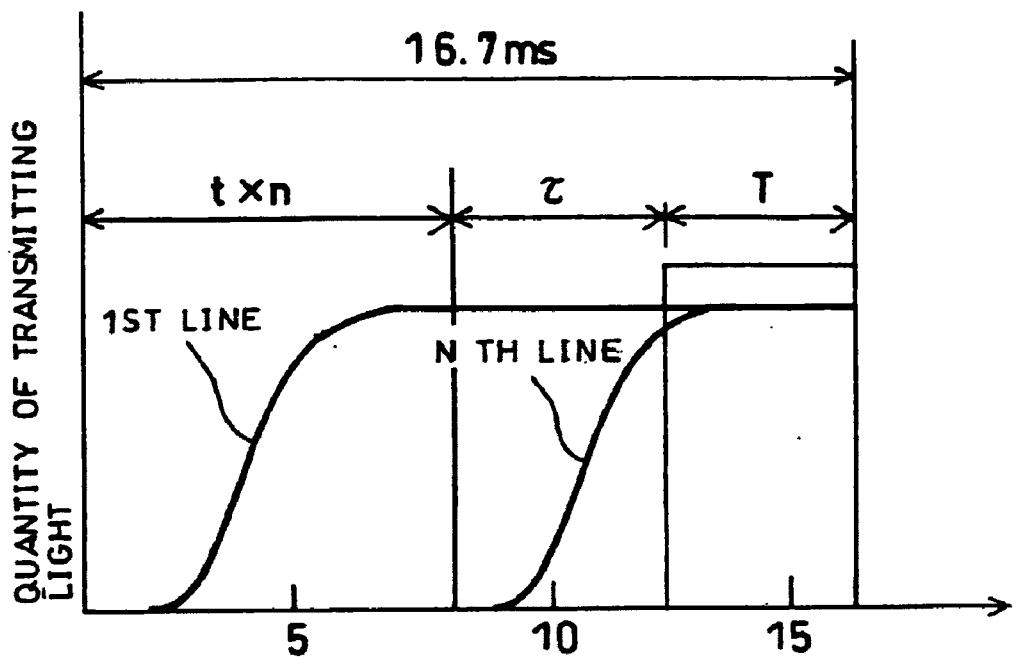
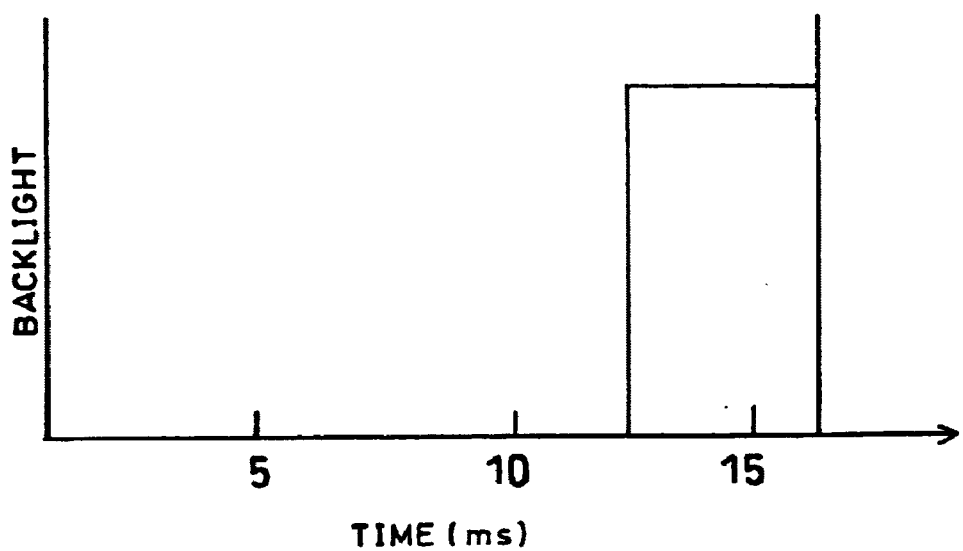
TIME (ms)

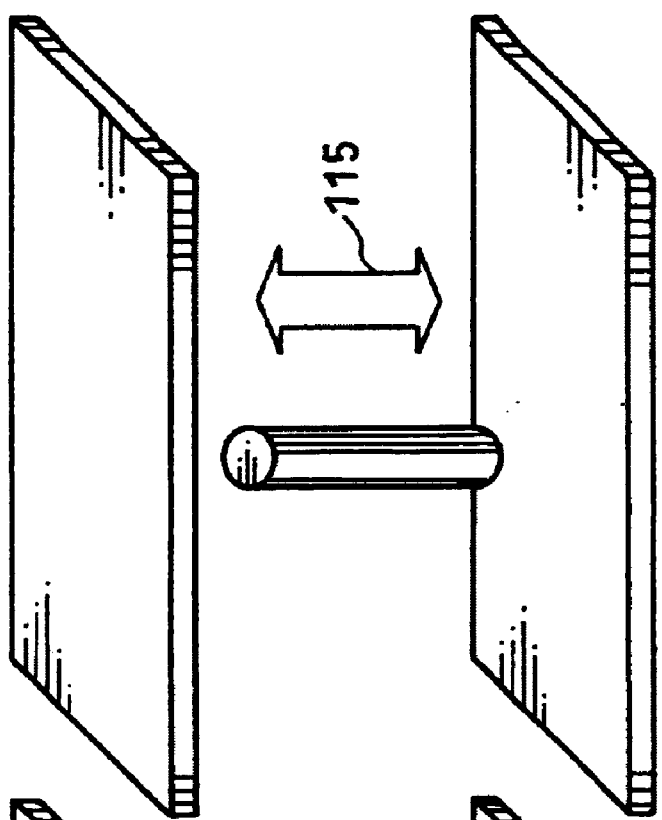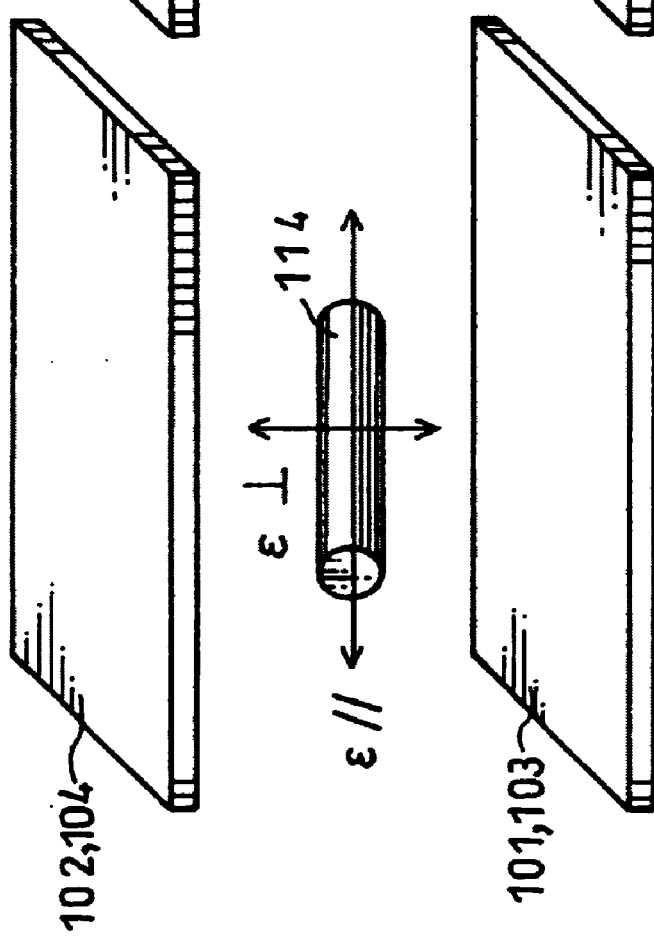

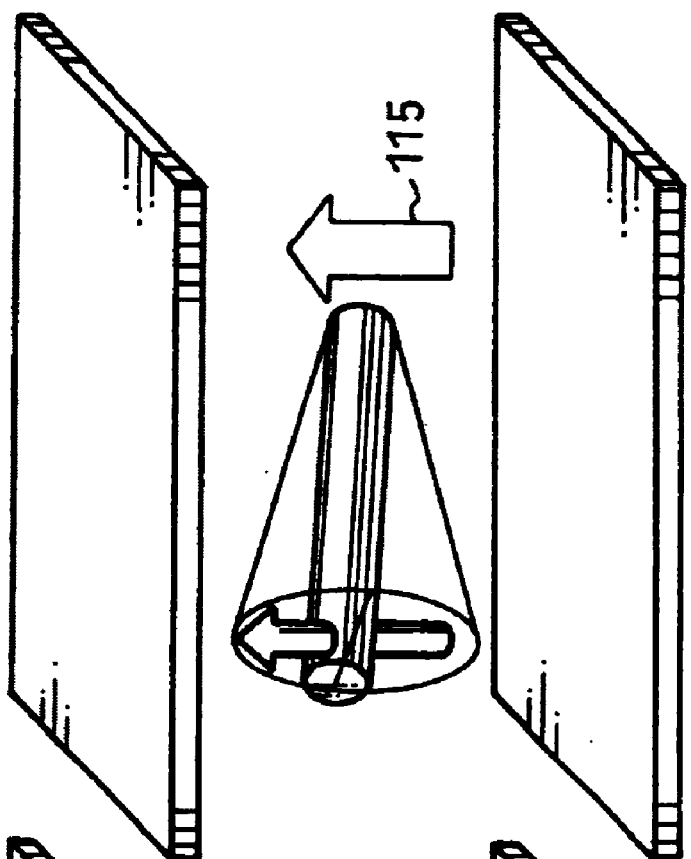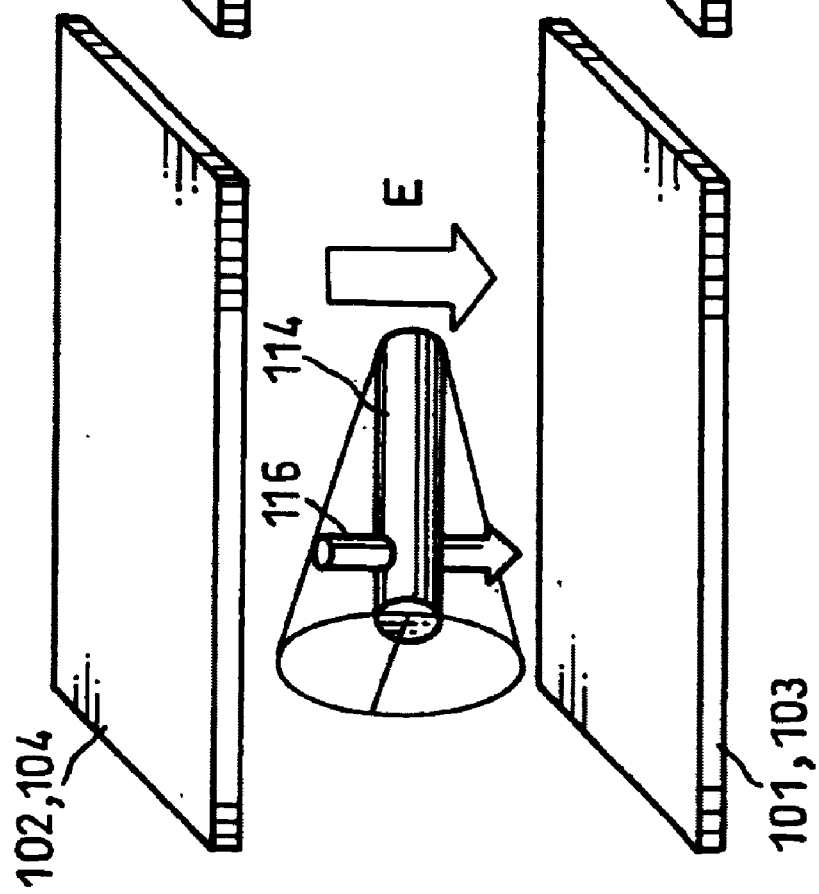

LIQUID CRYSTAL DISPLAY DEVICE AND DISPLAYING METHOD THEREOF

FIELD OF THE INVENTION

The present invention relates to a liquid crystal display device, which is capable of controlling any change in molecular orientation by electric fields having different directions and strengths so as to achieve fast response of an electric field, of liquid crystal display devices in which an electric field alters a molecular orientation of liquid crystal having dielectric anisotropy, and further concerns a displaying method thereof.

BACKGROUND OF THE INVENTION

As shown in FIGS. 12 and 13, a liquid crystal display device is formed by bonding a pair of substrates 101 and 102 together such that surfaces having the electrodes 103 and 104 oppose each other. FIG. 14 shows a sectional view of the device, in which insulating films 107 and 108 and orientation films 109 and 110 are stacked if necessary on electrodes 103 and 104 between a pair of substrates 101 and 102, and if necessary, an orientating operation such as rubbing is performed on the orientation films. Spacers 111, each having a desired diameter, are disposed on the substrate so as to bond the substrates together with an even gap. The substrates are fixed with a sealing agent 112. Finally, liquid crystal 113 is filled from an opening formed on the sealing agent, and the opening is sealed so as to complete the device. An orientating operation performed on the orientation films can achieve even orientation.

Each of the electrodes externally includes an extended part so as to apply an electric field having an arbitrary signal waveform to the liquid crystal. The liquid crystal alters its orientation according to an applied electric field and polarizes and modulates light passing through liquid crystal. A polarizer for visualizing polarization and modulation is provided if necessary so as to obtain a function of a display device. To transmit light through the liquid crystal layer, at least one of the electrodes needs to be a transparent electrode made of material such as ITO (indium tin oxide).

Further, liquid crystal display devices are broadly categorized into two kinds in view of an electrode structure. The following methods are available: a direct matrix method of forming stripe electrodes intersecting with one another, and an active-matrix method (see FIG. 13) of forming signal electrodes 105 intersecting on another on one of the substrates and forming switching elements 106 such as a transistor. In many cases, nematic liquid crystal is currently used as a liquid crystal material for any one of the methods.

The direct matrix method is simple in construction and manufacturing; however, a switching element is not provided for each pixel, so that all the pixels are coupled to one another with a capacitance. Thus, so-called crosstalk may appear, in which a switching threshold value becomes less clear in each of the pixel and a displayed image becomes less sharp with increasing number of pixels. Moreover, a transparent electrode such as ITO is a conductive material but is 100 to 1000 times higher than metal, etc. in resistance value. Thus, deformation on a signal waveform becomes more serious due to an electrode resistance of a transparent electrode, in response to the needs for a larger display device and a larger display capacity.

According to Japanese Unexamined Patent Application No. 287671/1995 (Tokukaihei 9-127494), a transparent electrode and a metallic wire are disposed in parallel so as to reduce an electrode resistance; however, a smaller aperture ratio lowers a luminance and reduces simplicity in manufacturing, that has been a characteristic of a direct matrix method.

Meanwhile, in the active-matrix method, a switching element is formed for each pixel, so that the manufacturing is more difficult than the direct matrix method. However, the pixels can be separately driven, so that no crosstalk occurs and a considerably clear image can be displayed. Also, it is possible to form a signal line making no contribution to transmission of light by using a metal such as Ti and Al. An opposing transparent electrode has a flat shape requiring no patterning, so that an electrode resistance hardly causes deformation on a signal waveform. Consequently, it is relatively easy to respond to a larger display device and a larger display capacity.

Therefore, a simple construction of the direct matrix method and a characteristic of a ferroelectric liquid crystal have been used in an attempt to solve crosstalk (N. Itoh et. al, Proceedings of The Fifth International Display Workshops (IDW'98), (1998) p. 205, '17" Video-Rate Full Color FLCD'). Ferroelectric liquid crystal is characterized by a property of memory and $\mu$s-digit fast response (N. Clark et. al, "Apply. Phys. Lett., 36" (1980), p.899 "Submicrosecond bistable electro-optic switching in liquid crystals"), so that displayed information can be successively written at a high speed for each scanning line and the written information can be maintained until a rewriting signal is inputted without applying voltage. Thus, it is possible to adopt a line-sequential driving method. With this arrangement, the direct matrix method can display a clear image as the active-matrix method, without causing crosstalk.

However, in the case of the direct matrix method, a problem of an electrode resistance cannot be solved by ferroelectric liquid crystal. An electrode resistance adversely affects a speed of a signal waveform as well as deformation thereof. Particularly in the case of a ferroelectric liquid crystal characterized by fast response, the foregoing technique of disposing a transparent electrode and a metallic wire in parallel is necessary. Consequently, a luminance is reduced by a smaller aperture ratio and a simple manufacturing cannot be achieved. Further, an electrode resistance increases power consumption and causes heat on a panel.

Considering this point, except for some of low-grade display devices, the active-matrix method is more suitable to a liquid crystal display device for displaying a moving picture with high resolution. Particularly, a thin-film transistor (TFT) method using a three-terminal element is superior to other methods such as a metal insulating film metallic layer (MIM) method using two-terminal element.

In order to allow a liquid crystal display device to contend with a CRT, which has been currently used as a main display device, and to replace the CRT as a flat display device in the future, some problems on picture quality need to be solved. The most critical problem of liquid crystal is a slow response to a signal waveform electric field. Here, the following describes the relationship between response speed and picture quality of liquid crystal.

On a currently used TFT-nematic liquid crystal display device (hereinafter, abbreviated as LCD), a moving image may be recognized as a blurred image. The cause is fully discussed in "Kurita, under the sponsorship of a LCD forum, "For LCD Advancement to CRT monitor market, -from the viewpoint of moving image display-", section 1 "displaying method of a hold type display and picture quality of a moving picture display, Liquid Crystal Society, 1998".

CRT and LCD differ in time response of displayed light. As shown in FIGS. 15 and 16, CRT has a displayed light of impulse type (FIG. 15), and LCD has a displayed light of hold type (FIG. 16). This is because liquid crystal only acts as a shutter for transmitting and shielding backlight, not spontaneous light, and because TN liquid crystal, which has been known and widely used, has a response speed of about 15 ms so as to make response by fully using one field of 16.7 ms. Hereinafter, for convenience of explanation, response time is equal to response speed in meaning.

In such a hold-type display, of eyeball movements, when a tracking movement (right and left eyeballs smoothly track a moving object substantially in the same manner), which is the most important for perceiving a moving image, and visual time integral effect are obtained in a substantially complete manner, the observer perceives an average brightness of some pixels. Thus, an image to be displayed by different pixels is completely erased. A ratio of the tracking movement is reduced in an eyeball movement with an increase in a moving speed; however, movement within 4 to 5 (degree/second) can be sufficiently followed only by the tracking movement. Further, regarding a short time period, a maximum speed of the tracking movement is 30 (degree/second). With respect to time integral effect, light stimulus in a short time of within several tens ms is integrated in a substantially complete manner if a luminance is at a certain degree or less.

A large number of actually displayed moving images satisfy the above angular speed and luminance, so that a blurred moving image appears due to a so-called eye tracking on a hold-type display. In order to eliminate a blurred moving image on LCD, it is necessary to adopt an impulse-type display used in CRT. Instead of providing backlight all the time, it is possible to adopt a method of using a shutter to provide an apparent impulse emission and a method of providing fast flashing. In any case, a response speed of liquid crystal needs to be remarkably higher than a current speed.

Referring to FIG. 17, the following describes this point. In FIG. 17, a horizontal axis indicates time and a vertical axis indicates a quantity of emitted backlight and a quantity of transmitting light on LCD. In FIG. 17, t represents time required for opening a gate (gate ON time), which is a scanning signal line of TFT. n represents the number of scanning signal lines (gate line). Hence, a display device having n scanning lines requires time of t×n to turn on all the TFTs. A curve of FIG. 17 indicates a time response property of liquid crystal, and τr indicates a rising response speed of liquid crystal.

After the last gate line of the n gate lines is turned on and liquid crystal on the $n_{th}$ line responds, a backlight is lit or emitted so as to provide an impulse-type display in the same manner as CRT. According to the foregoing document, backlight effectively used for an impulse-type display has an emitting period ratio (compaction ratio) of 25% for one field of 16.7 ms. Thus, T needs to be set at about 4 ms. When reproducing high-definition broadcasting having 1025 scanning lines, n is set at about 1000. A response speed of liquid crystal is τr=16.7 ms−t×n−T. Thus, the following relationship needs to be satisfied: τr≦16.7 ms−4 ms−t×n.

Currently, regarding amorphous silicon (αSi)—TFT achieving a large display device of 20 inch, a gate-on time t of TFT is about 10 μs. Regarding polysilicon (PSi)—TFT, which hardly provides a large display but has a high mobility of electrons, a gate-on time t is about 3 μs. It is understood that a response speed needs to be 2.7 ms or less in the case of (αSi)—TFT and at 9.7 ms or less in the case of (PSi)—TFT, in order to realize a full-spec moving image having no blurred image.

A PSi—TFT has a high process temperature of 1000° C. or more, so that quartz glass needs to be used instead of a normal glass substrate. Thus, it is difficult to achieve a large display and to realize a display device for providing full-spec high-definition broadcasting.

In FIG. 18, liquid crystal returns to an original state in different fields and transmitted light is shielded. τd represents a falling response speed, which requires fast response as a rising response speed τr. As earlier mentioned about the rising response, conventional TN liquid crystal has a response speed of about 15 ms. Even if the backlight system is replaced with an impulse type, it is not possible to achieve a full-spec moving image having no blurred image by using αSi—TFT at a response speed of 2.5 ms or less. Falling response is further slow from several tens ms to 100 ms.

Additionally, the following discusses the reason why the current liquid crystal has a low response speed. FIGS. 19(a) and 19(b) show electric field response of nematic liquid crystal. Transition time from FIG. 19(a) to FIG. 19(b) is rising time τr. Transition time from FIG. 19(b) to FIG. 19(a) is falling time τd. A cylinder indicates a liquid crystal molecular 114. The nematic liquid crystal is switched according to a dielectric anisotropy Δ∈, which is a permittivity difference between a molecular major axis direction and a molecular minor axis direction, and torque is produced by dielectric energy of $(½)\Delta{\in}E^2$ that occurs between liquid crystal and an applied electric field E115, so that orientation is changed. When Δ∈ is positive, orientation is changed such that a molecular major axis conforms to an electric field. When Δ∈ is negative, orientation is changed such that a molecular major axis intersects with an electric field.

Dielectric energy of $(½)\Delta{\in}E^2$ is scalar which does not depend upon a direction of the electric field E115; thus, even when the electric field E is ac, the nematic liquid crystal is changed only in one direction. After removing the electric field, the state returns to original orientation due to a reduction in viscosity of the liquid crystal. Hence, falling (τd) after removing an electric field is generally slower than rising (τr) caused by applying an electric field.

FIGS. 20(a) and 20(b) show electric field response of ferroelectric liquid crystal. Transition time from FIG. 20 (a) to FIG. 20(b) is rising time τr. Transition time from FIG. 20(b) to FIG. 20(a) is falling time τd. The ferroelectric liquid crystal is switched according to Ps·E, which is inner product energy of a spontaneous polarization Ps 116 and the electric field E115, and a direction of the spontaneous polarization Ps corresponds to an electric field direction so as to perform so-called in-plane switching, which is a switching in parallel on a surface of the substrate. Inner product energy Ps·E of the spontaneous polarization PS and the electric field E is vector quantity which depends upon a direction of the electric field E, so that a direction of the electric field E can switch optical rising (τr) and falling (τd) at a high speed.

As described above, ferroelectric liquid crystal is considerably advantageous in view of response speed; however, many problems peculiar to the ferroelectric liquid crystal arise. Nematic liquid crystal is free from these problems. Ferroelectric liquid crystal is smectic liquid crystal, which is closer to crystal as compared with nematic liquid crystal and has a layer structure in its molecular array. Thus, it is difficult to evenly orient a large area. Besides, the layer structure is prone to damage and the orientation may become uneven by mechanical impact, so that reliability may be reduced. To secure impact resistance, a wall-shaped structure can be formed in a display device so as to firmly fix a substrate (N. Ito et al., "Proceedings of The Fifth International Display Workshops (1998) p.205 '17" Video-Rate Full Color FLCD"); however, orientation becomes more difficult by forming a wall.

Further, ferroelectric liquid crystal has a spontaneous polarization, which is kept in one direction if switching is not carried out while a display signal is inputted. If this state continues for a long time, electrical charge may be accumulated at an interface between ferroelectric liquid crystal and an orientation film, resulting burn on a screen.

Moreover, ferroelectric liquid crystal needs to have a thin cell structure of 2 to 1.5 $\mu$m to make use of its characteristics. Hence, a cell capacity is larger than normal nematic liquid crystal (cell thickness of about 4 $\mu$m), causing a reduction in quantity of charging from TFT to a pixel within required time. Consequently, insufficient switching may occur. In order to solve this problem, the charging ability of TFT needs to be improved; however, a considerable change in a structure of TFT is not preferable in cost because the manufacturing becomes more difficult.

Therefore, studies have been conducted in earnest to improve response speed of nematic liquid crystal, which has been conventionally used. Actually, studies have been conducted to improve response speed by using orientation other than TN orientation, which has been mainly used and known well.

For example, a study has been known to achieve fast response of nematic liquid crystal by using orientation called bend cell or pie cell (T. Miyashita et al., "Conference Proceedings of The 13th International Display Research Conference (Euro Display'93)", (1993) p.149). It has been reported that a bend orientation cell shortens rising response speed to about 2 ms as compared with about 15 ms of the conventional TN orientation cell. The fast response is achieved by controlling a flow produced by response of liquid crystal (Miyashita et al., under the sponsorship of a LCD forum, "For LCD Advancement to CRT monitor market, -from the viewpoint of moving image display-", section 7 "Field Sequential full-color liquid crystal display using a fast response of OCB liquid crystal").

This flow is considerably large in twisted orientation such as TN orientation, resulting in slow response. The rising response speed may be increased in the same manner as bend cell only by switching between vertical orientation and horizontal orientation. However, these methods for reducing a flow also use dielectric anisotropy in the same manner as the conventional nematic liquid crystal. Thus, rising response speed is high upon application of an electric field; however, falling upon removing an electric field is slow as the conventional liquid crystal.

Therefore, some methods of solving slow falling response by a device structure have been reported in 'D. J. Channin et al., Applied Physics Letters, Vol.28, (1976) p.300 "Rapid Turn-off in triode optical gate liquid crystal devices"' and 'Shiotsu et al., "Basic Study of Liquid Crystal Light Bulb using a Comb Electrode", Society for Electronic Information Communication Shinetsu Branch Meeting, 1987'.

For instance, a plural gate structure has been proposed. Instead of parallel opposing electrodes arranged in a simple manner, a plurality of electrodes are three-dimensionally disposed, and electric fields with different directions are applied to nematic liquid crystal so as to switch an orientation direction according to an electric field direction. Changes in orientation are all controlled by an electric field; thus, fast response as the conventional rising can be achieved both at optical rising and falling, unlike the conventional falling due to a reduction in viscosity.

Techniques for three-dimensionally disposing electrodes are disclosed in Japanese Unexamined Patent Application No. 222397/1994 (Tokukaihei 6-222397) and Japanese Unexamined Patent Application No. 258245/1997 (Tokukaihei 9-258245). These techniques only relate to so-called in-plane switching (hereinafter, abbreviated as IPS) for switching nematic liquid crystal in parallel on a substrate. IPS is effective for widening a viewing angle of a liquid crystal display device; however, a direction of an applied electric field cannot be changed and switching is carried out by applying and removing an electric field. Thus, these techniques are equal to the conventional art in response speed.

FIGS. 21(a) and 21(b) schematically show the method of "Applied Physics Letters, Vol.28, (1976) p.300". FIGS. 22(a) and 22(b) schematically show the method of 'Shiotsu et al., "Basic Study of Liquid Crystal Light Bulb using a Comb Electrode", Society for Electronic Information Communication, Shinetsu Branch Meeting, 1987'. Substrates, an orientation film, and the like are omitted in the figures.

In FIGS. 21(a) and 21(b), an electrode 118 and an electrode 119 are disposed on one of the substrates while a resistant thin film 120 is sandwiched therebetween, and an opposing electrode 117 is disposed on the other substrate. According to the above document, the resistant thin film 120 has a sheet resistor of $10^7$ to $10^9$ $\Omega/\square$ and is formed by depositing amorphous Si or carbon film with a thickness of about 100 Å. As shown in FIG. 21(a), when the electrode 118 and the electrode 119 are set at a ground level, the resistant thin film is also set at the same ground level. When signal voltage Vc is applied to the opposing electrode 117, an electric field 115 appears across the pixel in an arrow direction perpendicular to the substrate and a liquid crystal molecule is oriented perpendicularly to the substrate. In this case, dielectric anisotropy of the liquid crystal is positive.

As shown in FIG. 21(b), when signal voltage Vd is applied to the electrode 118 so as to set the electrode 119 and the opposing electrode 117 at a ground level, an electric field 121 appears between the electrodes 118 and 119 horizontally to the substrate, and a liquid crystal molecule between the electrodes 118 and 119 is oriented horizontally to the substrate. Molecular orientation can be controlled by an electric field both at optical rising $\tau$r and falling $\tau$d; thus, unlike the conventional art, it is possible to solve slow falling caused by a reduction in viscosity. In FIGS. 22(a) and 22(b), an electrode 122 and an electrode 123 are disposed on one of substrates while a resistant thin film 120 is sandwiched therebetween, and an electrode 124 and an electrode 125 are disposed on the other substrate while a resistant thin film 120 is sandwiched therebetween. In FIG. 22(a), electrical signals with equal polarities are applied to the electrodes 122 and 123, and signals with opposite polarities are applied to the electrodes 124 and 125, so that the resistant thin films are equal in voltage level respectively to the electrodes 122 and 123, and the electrodes 124 and 125. And then, the electric field 115 appears across a pixel in an arrow direction perpendicular to the substrate, and a liquid crystal molecule is oriented perpendicularly to the substrate. Dielectric anisotropy of the liquid crystal is positive.

In FIG. 22(b), electrical signals with opposite polarities are applied to the electrodes 122 and 125, and the electrodes 123 and 124 are set at a ground level; thus, a diagonal electric field 126 appears between the electrode 122 and the electrode 125, and a liquid crystal molecule is oriented diagonally to the substrate. Molecular orientation can be controlled by an electric field both at optical rising τr and falling τd; thus, unlike the conventional art, it is possible to solve slow falling caused by a reduction in viscosity.

As described above, the plural gate structure can solve slow falling response but has a major problem on practical use as follows: a plurality of switching elements are required for one pixel as shown in FIGS. 21(*a*) to 22(*b*). In FIGS. 21(*a*) and 21(*b*), the electrode 117 and the electrode 118 need to be switched, so that two switching elements are necessary. In FIGS. 22(*a*) and 22(*b*), the electrodes 122 and 125 successively receive constant electrical signals; however, the electrodes 123 and 124 require the repetition of applying and suspending a signal, so that two switching elements are necessary.

Namely, it is necessary to form the switching elements on both of the substrates, so that manufacturing cost is doubled as compared with a conventional active-matrix display device. Further, considering a yield of the switching element, the more elements provided, the more defects occur. Consequently, the structure has a serious disadvantage in cost.

Additionally, a liquid crystal display device currently uses a color filter for providing a color display. However, a color filter pigment is less resistant to a high temperature, gas, acid, etc., so that a TFT is directly formed on a glass substrate and the color filter is disposed on an opposing substrate. It is not practical to form switching elements on both substrates because conventionally it has been too difficult to form a TFT on a color filter.

The second problem is the resistant thin film. As described above, the resistant thin film is made of a material such as Si and carbon with an extremely small thickness of about 100 Å. It is quite difficult to evenly form such a thin film on a large area in a technical point of view. In order to form an even film by deposition on a large area, a film thickness needs to be 500 Å or more, preferably about 1000 Å. For example, regarding FIGS. 21(*a*) and 21(*b*), the electrodes 118 and 119 of FIG. 21(*a*) are electrically connected to each other so as to generate an electric field on a pixel therebetween; meanwhile, in FIG. 21(*b*), the thin film needs to be a conductive material with high resistance to prevent current from being applied between the electrodes 118 and 119 due to opposite polarity signals applied to the electrodes. In an actual arrangement, high resistance deforms a waveform applied to a pixel between the electrodes 118 and 119, so that an electric field with sufficient strength cannot be applied. Besides, although a thin film is closer to a transparent film, a problem in luminance arises by stacking a material such as Si or carbon on a pixel because the material does not transmit light.

SUMMARY OF THE INVENTION

The objective of the present invention is to provide a liquid crystal display device which can achieve fast response and even display without a blurred moving image, and to provide a displaying method thereof.

In order to attain the above objective and to provide a liquid crystal display device which can suppress an increase in manufacturing cost while improving picture quality with fast response, the liquid crystal display device of the present invention, in which liquid crystal is formed in a gap between a pair of substrates including at least a single light-transmitting substrate, the device having a construction in which an electrode is formed on the substrate to apply a signal waveform electric field from outside to the liquid crystal, the liquid crystal changes its orientation according to an applied signal waveform, emitted light is modulated, and the modulation is visualized, is characterized in that a first substrate of the paired substrates includes a switching element and a switching electrode connected to the switching element, and a second substrate includes an opposing electrode and an insulation film formed on the opposing electrode, and a plurality of sub electrodes on the insulation film.

According to the above arrangement, of the paired substrates, the first substrate includes the switching element and the switching electrode connected to the switching element, and the second substrate includes the opposing electrode, the insulation film formed on the opposing electrode, and a plurality of the sub electrodes formed on the insulation film.

Additionally, the following construction is also applicable: a first substrate of the paired substrates includes a switching electrode where an image signal is applied, and a second substrate opposing the first substrate includes an opposing electrode where an image signal is not applied, an insulation film formed on the opposing electrode, and a plurality of sub electrodes where an image signal is not applied, the sub electrodes being formed on the insulation film.

Therefore, when an image signal is applied via the switching element to the electrode (switching electrode) connected to the switching element, the switching electrode has a predetermined potential. In this case, a direction of an electric field, which is applied to liquid crystal, is varied between parallel and perpendicular to the substrate, depending upon whether a potential of the switching electrode is in phase or in opposite phase with a potential of the electrode (sub electrode), which is not connected to the switching electrode. Thus, the orientation of liquid crystal varies between horizontal orientation and vertical orientation. Consequently, the orientation of liquid crystal is varied by changing a potential phase of the switching electrode.

As a result, rising response and falling response can be controlled by an electric field. A reduction in viscosity causes no falling response, so that fast response can be achieved.

Therefore, fast response is available without a blurred moving image.

Further, the present invention does not need to form a resistant thin film, which is difficult to evenly form because of its small thickness. Hence, it is possible to prevent uneven display.

Moreover, the present invention requires only a single element for switching. Thus, it is possible to suppress an increase in manufacturing cost.

Besides, nematic liquid crystal is applicable to the present invention. Namely, without the necessity for ferroelectric liquid crystal, which achieves fast response but causes a peculiar problem such as uneven orientation, low resistance to impact, and burn, it is possible to achieve fast response by using nematic liquid crystal, which has been widely used, relatively easy to handle, and less prone to the above problems. For this reason, the problems of even orientation, resistance to impact, and burn do not occur. Consequently, with nematic liquid crystal, it is possible to provide a liquid crystal display device making high-speed electric field response at optical rising and falling.

Also, a displaying method of the liquid crystal display device according to the present invention is characterized in that different constant electric signals are respectively inputted to the opposing electrode and the sub electrode, and an electric signal varying according to an image signal is inputted to the switching element, in the liquid crystal display device having the above construction.

According to the above arrangement, different constant electric signals are inputted respectively to the opposing electrode and the sub electrode, and an electric signal varying according to an image signal is inputted to the switching element.

Here, the following construction is also available: constant electric signals having different voltage values are inputted to the opposing electrode and the sub electrode, and an electric signal varying according to an image signal is inputted to the switching electrode.

Hence, when an image signal is applied via the switching element to the electrode (switching electrode) connected to the switching element, the switching electrode has a predetermined potential. In this case, a direction of an electric field, which is applied to liquid crystal, is varied between parallel and perpendicular to the substrate, depending upon whether a potential of the switching electrode is in phase or in opposite phase with a potential of the electrode (sub electrode), which is not connected to the switching electrode. Thus, the orientation of liquid crystal varies between horizontal orientation and vertical orientation. Consequently, the orientation of liquid crystal is varied by changing a potential phase of the switching electrode.

As a result, rising response and falling response can be controlled by an electric field. A reduction in viscosity causes no falling response, so that fast response can be achieved.

Therefore, fast response is available without a blurred moving image.

Further, the present invention does not need to form a resistant thin film, which is difficult to evenly form because of its small thickness. Hence, it is possible to prevent uneven display.

Moreover, the present invention requires only a single element for switching. Thus, it is possible to suppress an increase in manufacturing cost.

Besides, nematic liquid crystal is applicable to the present invention. Namely, without the necessity for ferroelectric liquid crystal, which achieves fast response but causes a peculiar problem such as uneven orientation, low resistance to impact, and burn, it is possible to achieve fast response by using nematic liquid crystal, which has been widely used, relatively easy to handle, and less prone to the above problems. For this reason, problems of even orientation, resistance to impact, and burn do not occur. Consequently, with nematic liquid crystal, it is possible to provide a liquid crystal display device making high-speed electric field response at optical rising and falling.

Furthermore, the displaying method of the liquid crystal display device according to the present invention is characterized in that the opposing electrode is grounded, in-phase voltage is applied to the sub electrode and the switching electrode so as to obtain darkness, and voltage with an opposite phase is applied to the sub electrode and the switching electrode so as to obtain brightness.

According to the above arrangement, the opposing electrode is grounded, in-phase voltage is applied to the sub electrode and the switching electrode so as to obtain darkness, and voltage with an opposite phase is applied to the sub electrode and the switching electrode so as to obtain brightness.

Besides, the following arrangement is also applicable: the opposing electrode has a predetermined and fixed potential, voltage with the same polarity, preferably voltage with the same voltage value is applied to the sub electrode and the switching electrode so as to obtain darkness, and voltage with opposite phase is applied to the sub electrode and the switching electrode so as to obtain brightness.

Therefore, when an image signal is applied via the switching element to the electrode (switching electrode) connected to the switching element, the switching electrode has a predetermined potential. In this case, a direction of an electric field, which is applied to liquid crystal, is varied between parallel and perpendicular to the substrate, depending upon whether a potential of the switching electrode is in phase or in opposite phase with a potential of the electrode (sub electrode), which is not connected to the switching electrode. Thus, the orientation of liquid crystal varies between horizontal orientation and vertical orientation. Consequently, the orientation of liquid crystal is varied by changing a potential phase of the switching electrode.

Thus, fast response can be achieved without a blurred moving image. Further, monochrome display is available with a remarkably preferable contrast. Also, with the combination of a color filter and so on, favorable full-color display is also available.

Additionally, the present invention does not need to form a resistant thin film, which is difficult to evenly form because of its small thickness. Hence, it is possible to prevent uneven display.

Moreover, the present invention requires only a single element for switching. Thus, it is possible to suppress an increase in manufacturing cost.

Besides, nematic liquid crystal is applicable to the present invention. Namely, without the necessity for ferroelectric liquid crystal, which achieves fast response but causes a peculiar problem such as uneven orientation, low resistance to impact, and burn, it is possible to achieve fast response by using nematic liquid crystal, which has been widely used, relatively easy to handle, and less prone to the above problems. For this reason, problems of even orientation, resistance to impact, and burn do not occur. Consequently, nematic liquid crystal can be used to provide a liquid crystal display device making high-speed electric field response at optical rising and falling.

Besides, the liquid crystal display device of the present invention, in which liquid crystal is formed in a gap between a pair of substrates including at least a single light-transmitting substrate, the device having a construction in which an electrode is formed on the substrate to apply a signal waveform electric field from outside to the liquid crystal, the liquid crystal changes its orientation according to an applied signal waveform, emitted light is modulated, and the modulation is visualized, is characterized in that a first substrate of a pair of the substrates includes a switching element, a resistant film, a switching electrode connected to the switching element and an electrode which is not connected to the switching element on the resistant film, and a second substrate includes an opposing electrode which is not connected to the switching element.

According to the above arrangement, the first substrate of the paired substrates includes the switching element, the resistant film, the switching electrode connected to the switching element and the electrode which is not connected to the switching element on the resistant film, and the second substrate includes the opposing electrode which is not connected to the switching element.

Further, the following arrangement is also applicable: a first substrate of the paired substrates includes a resistant film, a switching electrode where an image signal is applied on the resistant film, and a sub electrode acting as a non-switching electrode where an image signal is not applied on the resistant film, and a second substrate opposing the first substrate includes an opposing electrode where an image signal is not applied.

Therefore, when an image signal is applied via the switching element to the electrode (switching electrode) connected to the switching element, the switching electrode has a predetermined potential. In this case, a direction of an electric field, which is applied to liquid crystal, is varied between parallel and perpendicular to the substrate, depending upon whether a potential of the switching electrode is in phase or in opposite phase with a potential of the electrode (sub electrode), which is not connected to the switching electrode on the first substrate. Thus, the orientation of liquid crystal varies between horizontal orientation and vertical orientation. Consequently, the orientation of liquid crystal is varied by changing a potential phase of the switching electrode.

As a result, rising response and falling response can be controlled by an electric field. A reduction in viscosity causes no falling response, so that fast response can be achieved.

Therefore, fast response is available without a blurred moving image.

Moreover, the present invention requires only a single element for switching. Thus, it is possible to suppress an increase in manufacturing cost.

Further, the present invention does not need to form a resistant thin film, which is difficult to evenly form because of its small thickness. Hence, it is possible to prevent uneven display.

Besides, nematic liquid crystal is applicable to the present invention. Namely, without the necessity for ferroelectric liquid crystal, which achieves fast response but causes a peculiar problem such as uneven orientation, low resistance to impact, and burn, it is possible to achieve fast response by using nematic liquid crystal, which has been widely used, relatively easy to handle, and less prone to the above problems. For this reason, problems of even orientation, resistance to impact, and burn do not occur. Consequently, with nematic liquid crystal, it is possible to provide a liquid crystal display device making high-speed electric field response at optical rising and falling.

Furthermore, the displaying method of the present invention is characterized in that: in the liquid crystal display device having the above construction, signal waveforms with opposite polarities are applied to the electrode which is connected to the switching element and to the electrode which is not connected thereto on the first substrate, so that an electric field is generated in a substantially horizontal direction to a surface of the substrate between the electrode which is connected to the switching element and the electrode which is not connected thereto; and signal waveforms with the same polarities are applied to the electrode which is connected to the switching element and the electrode which is not connected to the switching element on the first substrate, so that an electric field is generated vertically to a surface of the substrate between the electrode which is connected to the switching element, the electrode which is not connected to the switching element, and the resistant film, and the grounded opposing electrode.

According to this arrangement, signal waveforms with opposite polarities are applied to the electrode which is connected to the switching element and the electrode which is not connected thereto on the first substrate, so that an electric field is generated in a substantially horizontal direction to a surface of the substrate between the electrode which is connected to the switching element and the electrode which is not connected thereto, and signal waveforms with the same polarities are applied to the electrode which is connected to the switching element and the electrode which is not connected thereto on the first substrate, so that an electric field is generated vertically to a surface of the substrate between the electrode which is connected to the switching element, the electrode which is not connected to the switching element, and the resistant film, and the grounded opposing electrode.

Additionally, the following arrangement is also applicable: on the first substrate, signal waveforms with opposite polarities are applied to the switching electrode where an image signal is applied and the sub electrode where an image signal is not applied, so that an electric field is generated in a substantially horizontal direction to a surface of the substrate between the switching electrode and the sub electrode; meanwhile, signal waveforms with the same polarity are applied to the switching electrode and the sub electrode, so that an electric field is generated vertically to the surface of the substrate between the switching electrode, the sub electrode, and the resistant film, and the opposing film.

Therefore, when an image signal is applied via the switching element to the electrode (switching electrode) connected to the switching element, the switching electrode has a predetermined potential. In this case, a direction of an electric field, which is applied to liquid crystal, is varied between parallel and perpendicular to the substrate, depending upon whether a potential of the switching electrode is in phase or in opposite phase with a potential of the electrode (sub electrode), which is not connected to the switching electrode on the first substrate. Thus, the orientation of liquid crystal varies between horizontal orientation and vertical orientation. Consequently, the orientation of liquid crystal is varied by changing a potential phase of the switching electrode.

As a result, rising response and falling response can be controlled by an electric field. A reduction in viscosity causes no falling response, so that fast response can be achieved.

Therefore, fast response is available without a blurred moving image.

Moreover, the present invention requires only a single element for switching. Thus, it is possible to suppress an increase in manufacturing cost.

Further, the present invention does not need to form a resistant thin film, which is difficult to evenly form because of its small thickness. Hence, it is possible to prevent uneven display.

Besides, nematic liquid crystal is applicable to the present invention. Namely, without the necessity for ferroelectric liquid crystal, which achieves fast response but causes a peculiar problem such as uneven orientation, low resistance to impact, and burn, it is possible to achieve fast response by using nematic liquid crystal, which has been widely used, relatively easy to handle, and less prone to the above problems. For this reason, problems of even orientation, resistance to impact, and burn do not occur. Consequently, with nematic liquid crystal, it is possible to provide a liquid crystal display device making high-speed electric field response at optical rising and falling.

Moreover, the displaying method of the present invention is characterized in that the liquid crystal display device having the above construction includes a pair of polarizers, signal waveforms with opposite polarities are applied to the electrode which is connected to the switching element and the electrode which is not connected thereto on the first substrate, so that an electric field is generated in a substantially horizontal direction to a surface of the substrate, between the electrode which is connected to the switching element and the electrode which is not connected thereto, so as to provide bright display; and signal waveforms with the same polarity are applied to the electrode which is connected to the switching element and the electrode which is not connected to the switching element on the first substrate, so that an electric field is generated vertically to a surface of the substrate between the electrode which is connected to the switching element, the electrode which is not connected to the switching element, and the resistant film, and the grounded opposing electrode, so as to provide dark display.

According to the above arrangement, a pair of polarizers are provided, and signal waveforms with opposite polarities are respectively applied to the electrode which is connected to the switching element and the electrode which is not connected to the switching element on the first substrate, so that an electric field is generated in a substantially horizontal direction to a surface of the substrate, between the electrode which is connected to the switching element and the electrode which is not connected thereto, so as to provide bright display; and signal waveforms with the same polarity are applied to the electrode which is connected to the switching element and the electrode which is not connected to the switching element on the first substrate, so that an electric field is generated vertically to a surface of the substrate between the electrode which is connected to the switching element, the electrode which is not connected to the switching element, and the resistant film, and the grounded opposing electrode, so as to provide dark display.

Additionally, the following arrangement is also applicable: the opposing electrode has a fixed and predetermined potential, and signal waveforms with opposite polarities are applied to the electrode (switching electrode) where an image signal is applied and the electrode (sub electrode) where an image signal is not applied on the first substrate, so that an electric field is generated in a substantially horizontal direction to a surface of the substrate between the switching electrode and the sub electrode, so as to provide bright display; and signal waveform with the same polarity, preferably signal waveforms with the same voltage value are applied to the switching electrode and the sub electrode, so that an electric field is generated vertically to a surface of the substrate between the switching electrode, the sub electrode, and the resistant film, and the opposing electrode, so as to provide dark display.

Therefore, when an image signal is applied via the switching element to the electrode (switching electrode) connected to the switching element, the switching electrode has a predetermined potential. In this case, a direction of an electric field, which is applied to liquid crystal, is varied between parallel and perpendicular to the substrate, depending upon whether a potential of the switching electrode is in phase or in opposite phase with a potential of the electrode (sub electrode), which is not connected to the switching electrode on the first substrate. Thus, the orientation of liquid crystal varies between horizontal orientation and vertical orientation. Consequently, the orientation of liquid crystal is varied by changing a potential phase of the switching electrode.

Thus, fast response can be achieved without a blurred moving image. Further, monochrome display is available with a remarkably preferable contrast. Also, with the combination of a color filter and so on, favorable full-color display is also available.

Moreover, the present invention requires only a single element for switching. Thus, it is possible to suppress an increase in manufacturing cost.

Further, the present invention does not need to form a resistant thin film, which is difficult to evenly form because of its small thickness. Hence, it is possible to prevent uneven display.

Besides, nematic liquid crystal is applicable to the present invention. Namely, without the necessity for ferroelectric liquid crystal, which achieves fast response but causes a peculiar problem such as uneven orientation, low resistance to impact, and burn, it is possible to achieve fast response by using nematic liquid crystal, which has been widely used, relatively easy to handle, and less prone to the above problems. For this reason, problems of even orientation, resistance to impact, and burn do not occur. Consequently, nematic liquid crystal can be used to provide a liquid crystal display device making high-speed electric field response at optical rising and falling.

Besides, the liquid crystal display device of the present invention, in which liquid crystal is formed in a gap between a pair of substrates including at least a single light-transmitting substrate, the device having a construction in which an electrode is formed on the substrate to apply a signal waveform electric field from outside to the liquid crystal, the liquid crystal changes its orientation according to an applied signal waveform, emitted light is modulated, and the modulation is visualized, is characterized in that a first substrate of the paired substrates includes a first electrode and a second electrode which are respectively connected to a first switching element and a second switching element, a third electrode which is not connected to the switching element, and an insulator, the first electrode and the third electrode are opposed to the second electrode via the insulation film, and the second substrate includes an opposing electrode which is not connected to the switching element.

According to the above arrangement, the first substrate of the paired substrates includes the first electrode and the second electrode which are respectively connected to the first and second switching elements, the third electrode which is not connected to the switching element, and the insulator; the first electrode and the third electrode are opposed to the second electrode via the insulation film; and the second substrate includes the opposing electrode which is not connected to the switching element.

Further, the following arrangement is applicable: a first substrate of the paired substrates includes a second switching electrode film where an image signal is applied, an insulation film on the second switching electrode film, a first switching electrode where an image signal is applied and a sub electrode (third electrode) acting as a non-switching electrode where an image signal is not applied, on the insulation film, and a second substrate opposing the first substrate includes an opposing electrode where an image signal is not applied.

Therefore, when an image signal is applied to the electrodes (first and second switching electrodes) respectively connected to the first and second switching elements via the switching elements, the first and second switching electrodes have predetermined potentials. In this case, a direction of an electric field, which is applied to liquid crystal, is varied between parallel and perpendicular to the substrate, depending upon whether potentials of the first and second switching electrodes are in phase or in opposite phase with potentials of the electrodes (sub electrode, third electrode), which are not connected to the switching electrode on the first substrate. Thus, the orientation of liquid crystal varies between horizontal orientation and vertical orientation. Consequently, the orientation of liquid crystal is varied by changing a potential phase of the switching electrode.

Consequently, rising response and falling response can be controlled by an electric field. A reduction in viscosity causes no falling response, so that fast response can be achieved.

Therefore, fast response is available without a blurred moving image.

Further, the present invention does not need to form a resistant thin film, which is difficult to evenly form because of its small thickness. Hence, it is possible to prevent uneven display.

Besides, nematic liquid crystal is applicable to the present invention. Namely, without the necessity for ferroelectric liquid crystal, which achieves fast response but causes a peculiar problem such as uneven orientation, low resistance to impact, and burn, it is possible to achieve fast response by using nematic liquid crystal, which has been widely used, relatively easy to handle, and less prone to the above problems. For this reason, problems of even orientation, resistance to impact, and burn do not occur. Consequently, with nematic liquid crystal, it is possible to provide a liquid crystal display device making high-speed electric field response at optical rising and falling.

Furthermore, the displaying method of the liquid crystal display device according to the present invention is characterized in that: in the liquid crystal display device having the above arrangement, signal waveforms with opposite polarity are applied to the first electrode and the third electrode, so that an electric field is generated in a substantially horizontal direction to a surface of the substrate between the first and the third substrates; and signal waveforms with the same polarity are applied to the first to third electrodes, so that an electric field is generated vertically to a surface of the substrate between the first to third electrodes and the opposing electrode on the second substrate.

According to the above arrangement, signal waveforms with opposite polarity are applied to the first electrode and the third electrode, so that an electric field is generated in a substantially horizontal direction to a surface of the substrate between the first and the third substrates; and signal waveforms with the same polarity are applied to the first to third electrodes, so that an electric field is generated vertically to a surface of the substrate between the first to third electrodes and the opposing electrode on the second substrate.

Also, the following arrangement is also applicable: the opposing electrode and the second electrode have predetermined and fixed potentials, signal waveforms with opposite polarity are applied to the first electrode (switching electrode) where an image signal is applied and the third electrode (sub electrode) where an image signal is not applied on the first substrate, so that an electric field is generated in a substantially horizontal direction to a surface of the substrate between the switching electrode and the sub electrode so as to provide bright display; and signal waveforms with the same polarity, preferably with the same voltage value are applied to the switching electrode, the sub electrode and the second electrode, so that an electric field is generated vertically to a surface of the substrate between the switching electrode, the sub electrode, and the second electrode, and the opposing electrode so as to provide dark display.

Therefore, when an image signal is applied via the switching element to the electrodes (first and second switching electrodes) respectively connected to the first and second switching elements, the first and second switching electrodes respectively have predetermined potentials. In this case, a direction of an electric field, which is applied to liquid crystal, is varied between parallel and perpendicular to the substrate, depending upon whether potentials of the first and second switching electrodes are in phase or in opposite phase with potentials of the electrodes (sub electrode, third electrode), which are not connected to the switching electrode on the first substrate. Thus, the orientation of liquid crystal varies between horizontal orientation and vertical orientation. Consequently, the orientation of liquid crystal is varied by changing a potential phase of the switching electrode.

Thus, fast response can be achieved without a blurred moving image. Further, monochrome display is available with a remarkably preferable contrast. Also, with the combination of a color filter and so on, favorable full-color display is also available.

Further, the present invention does not need to form a resistant thin film, which is difficult to evenly form because of its small thickness. Hence, it is possible to prevent uneven display.

Besides, nematic liquid crystal is applicable to the present invention. Namely, without the necessity for ferroelectric liquid crystal, which achieves fast response but causes a peculiar problem such as uneven orientation, low resistance to impact, and burn, it is possible to achieve fast response by using nematic liquid crystal, which has been widely used, relatively easy to handle, and less prone to the above problems. For this reason, problems of even orientation, resistance to impact, and burn do not occur. Consequently, with nematic liquid crystal, it is possible to provide a liquid crystal display device making high-speed electric field response at optical rising and falling.

For a fuller understanding of the nature and advantages of the invention, reference should be made to the ensuing detailed description taken in conjunction with the accompanying drawings.

BRIEF DESCRIPTION OF THE DRAWINGS

FIGS. 4(*a*) and 4(*b*) are explanatory drawings schematically showing sectional structures of the liquid crystal display device according to the present invention.

FIG. 17 is an explanatory drawing showing a cause of a blurred moving image and a method of providing impulse-type display on liquid crystal.

FIGS. 19(a) and 19(b) are explanatory drawings showing rising response and falling response of nematic liquid crystal having a conventional one-directional electric field.

FIGS. 20(a) and 20(b) are explanatory drawings showing response of ferroelectric liquid crystal, which can control both of rising and falling of a conventional two-directional electric field.

DESCRIPTION OF THE EMBODIMENTS

EMBODIMENT

Referring to FIGS. 1(a) to 3, the following explanation describes one embodiment of the present invention. Hereinafter, a substrate, an orientation film, and so on are omitted in the figures.

Figure 1:
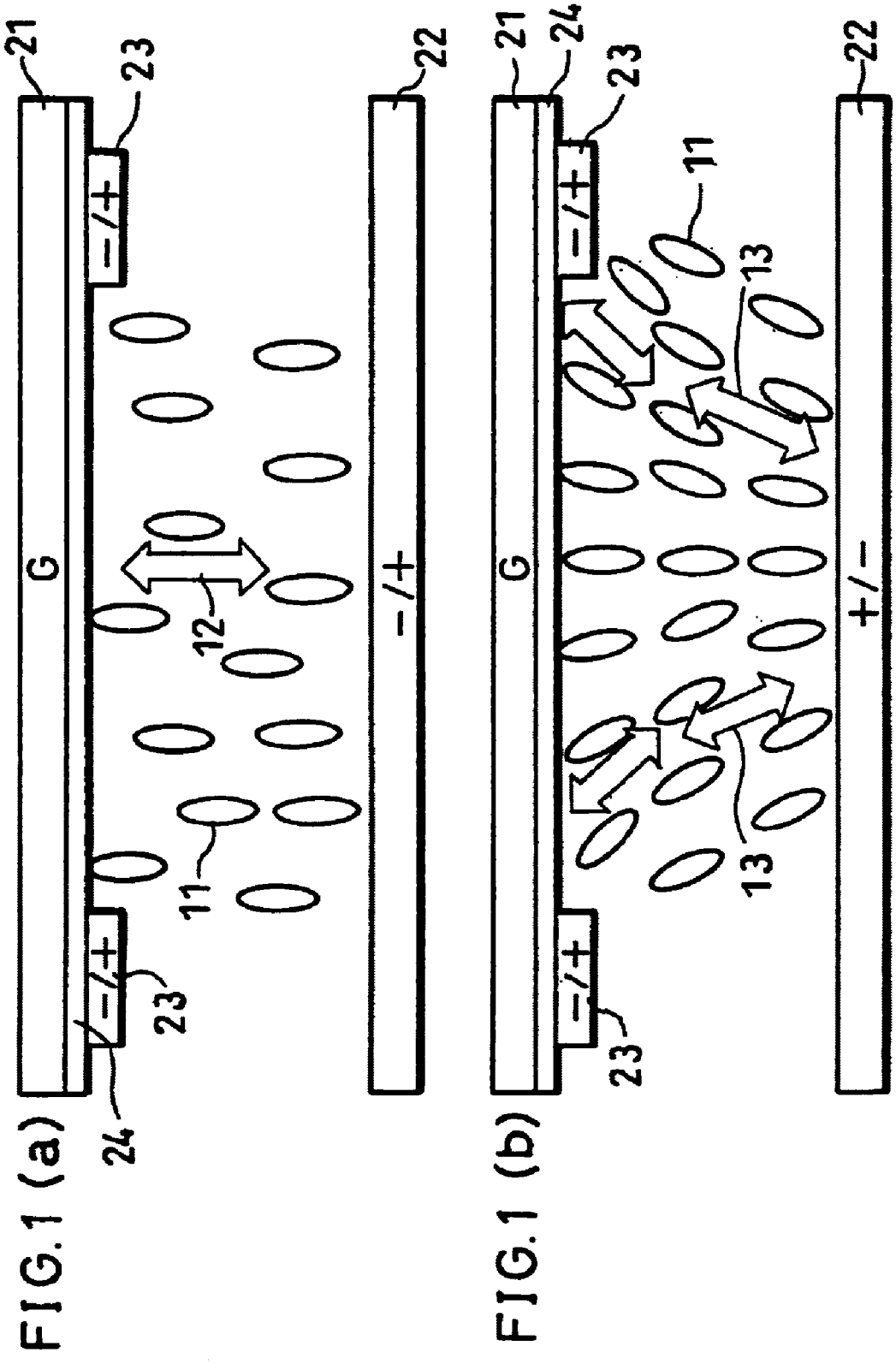
FIGS. 1(*a*) and 1(*b*) are explanatory drawings schematically showing sectional structures of a liquid crystal display device according to the present invention.

One embodiment of the present invention will be discussed in detail referring to the figures. FIG. 1 is a sectional drawing schematically showing the construction of a liquid crystal display device according to the present invention. The construction is identical to a conventional liquid crystal display device in that an opposing electrode 21 is disposed so as to oppose a switching electrode 22, which is in contact with a switching element such as a TFT. An insulating film 24 is formed on a surface of the opposing electrode 21 that opposes the switching electrode 22, and sub electrodes 23 are provided on the insulating film 24. For convenience of explanation, dielectric anisotropy of nematic liquid crystal is positive. One of the switching electrode 22 and the opposing electrode 21 that constitute a pixel is a transparent electrode. The sub electrode 23 may be composed of a transparent electrode or an opaque electrode such as a metallic electrode. 11 represent liquid crystal molecules. Transition time from FIG. 1(a) to FIG. 1(b) is rising time $\tau r$, and transition time from FIG. 1(b) to FIG. 1(a) is falling time $\tau d$.

As shown in FIGS. 1(a) and 1(b), the opposing electrode 21 is set at a ground level and a constant ac signal is applied to the sub electrodes 23. In this state, as shown in FIG. 1(b), when a signal having an opposite polarity from that of the sub electrodes 23 is applied to the switching electrode 22, a potential difference between the switching electrode 22 and the sub electrode 23 is larger than that between the switching electrode 22 and a ground level of the opposing electrode 21. Hence, a diagonal electric field 13 appears as shown by arrows. The liquid crystal molecules 11 changes their orientation in an electric field direction so as to make rising response.

As shown in FIG. 1(a), when signal polarity of the switching electrode 22 is reversed so as to apply a signal which is equal in polarity to a signal applied to the sub electrode 23, the diagonal electric field 13 disappears between the switching electrode 22 and the sub electrodes 23 so as to generate a vertical electric field 12 between the switching electrode 22 and a ground level of the opposing electrode 21. The liquid crystal molecules 11 change their orientation in an electric field direction so as to make falling response.

Here, with comparison between the present embodiment and a conventional art, the following discusses the conventional construction which may be confused with the present embodiment. Like the conventional methods shown in FIGS. 21(a) to 22(b), the present embodiment controls both rising response and falling response by using an electric field, and a reduction in viscosity causes no falling response; thus, fast response can be achieved. In FIGS. 21(a) to 22(b), although the number of switching elements for one pixel is important in view of manufacturing cost, the present embodiment requires only one element to solve the problem.

Furthermore, unlike FIGS. 21(a) to 22(a), in which a resistant thin film 120 with high resistance applies an electric field largely to a pixel, in the present embodiment, the switching electrode 22 and the opposing electrode 21 directly apply an electric field, thereby causing no deformation on a waveform of a signal. The insulating film can be formed by depositing a material such as $Ta_2O_5$, with a thickness of 1000 to 2000 Å, so that an even film can be readily formed as compared with a resistant thin film of FIGS. 21(a) to 22(b).

Figure 2:
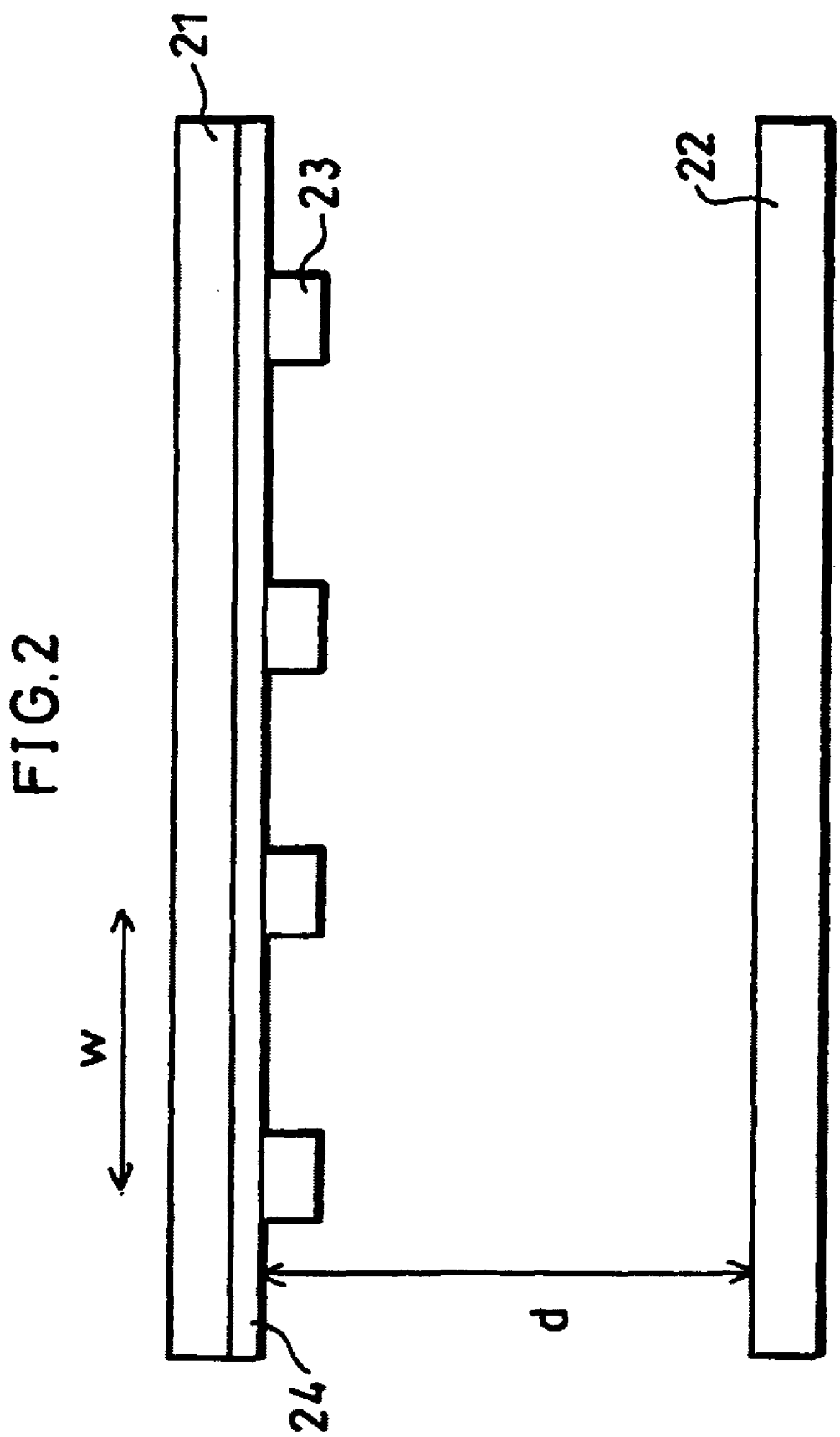
FIG. 2 is an explanatory drawing showing the relationship between a cell thickness d and a distance W between sub electrodes.

An actual liquid crystal display device has a pixel pitch of about 100 $\mu$m and a cell thickness of about 5 $\mu$m. It is therefore possible to dispose a plurality of the sub electrodes 23 as shown in FIG. 2 so as to sufficiently generate a diagonal electric field between the switching electrode 22 and the sub electrodes 23; thus, a distance W between the sub electrodes can be adjusted relative to cell thickness d.

Further, publications such as Japanese Unexamined Patent Application No. 239127/1987 (Tokukaisho 62-239127) and Japanese Unexamined Patent Application No. 239128/1987 (Tokukaisho 62-239128) disclose a construction including a transparent electrode forming a pixel and a metallic electrode with a small width. The transparent electrode and the metallic electrode directly come into contact with each other, and an electric field slope is formed in a pixel according to a difference in resistance values.

Consequently, the above construction is distinct from the electrode structure of the present embodiment, in which the insulating film is formed between the opposing electrode and the sub electrodes.

Additionally, the present embodiment does not require orientation. In a display device using nematic liquid crystal, it is generally necessary to perform orientation on a surface of a substrate. As shown in FIGS. 19(*a*) and 19(*b*), display is provided by switching application and non-application of an electric field. Hence, in order to achieve even orientation upon non-application, the substrate needs to have orientation regulating force by forming an orientation film or performing rubbing thereon.

Figure 3:
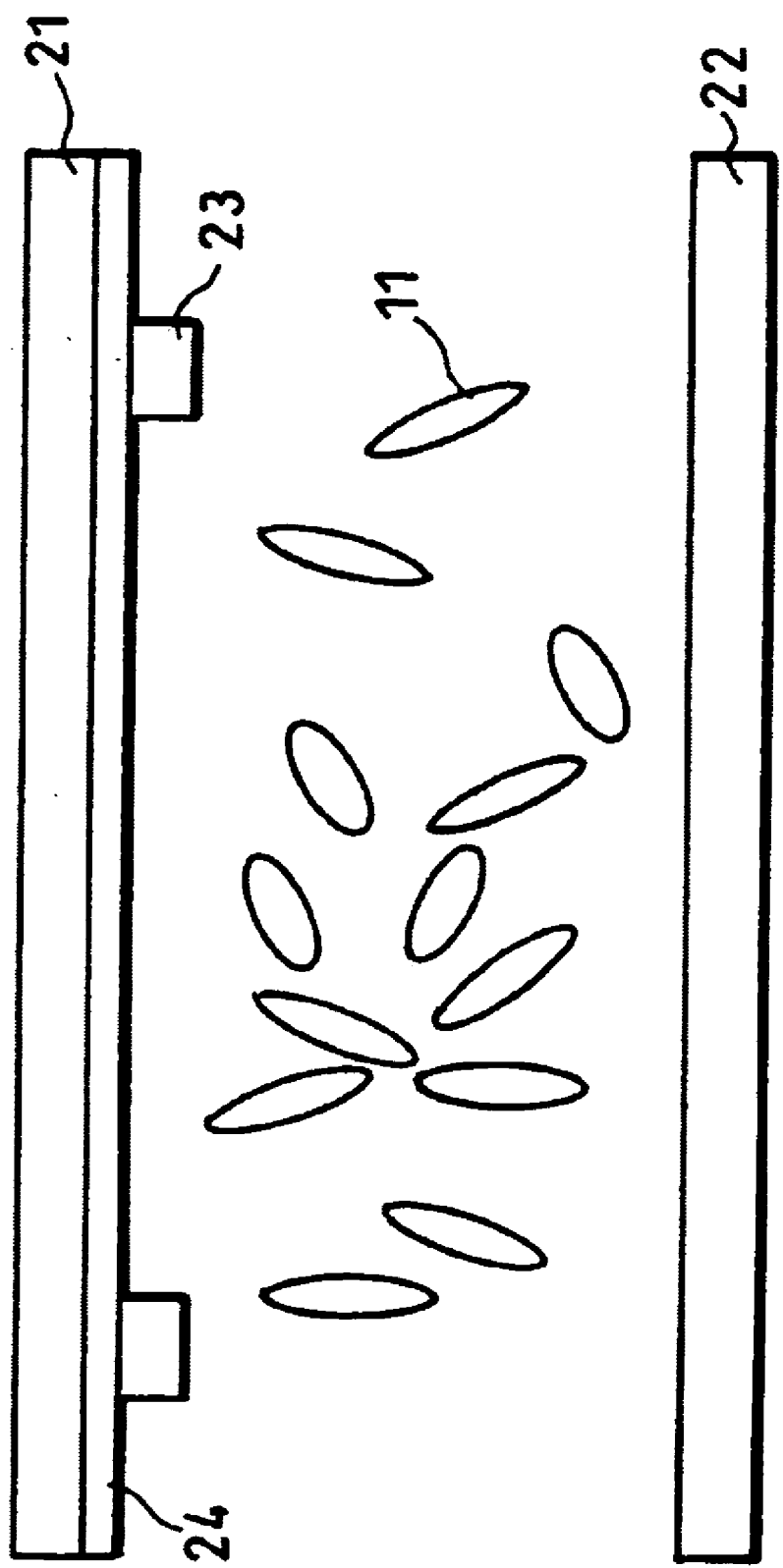
FIG. 3 is an explanatory drawing showing orientation of liquid crystal in a voltage non-application state.

Upon application of an electric field, even if the substrate does not have orientation regulating force, liquid crystal is evenly oriented by an electric field. Consequently, the display device of the present embodiment, which does not produce non-application state of an electric field during a display period, eliminates the need for orientation. While the power of the display device is turned off, the liquid crystal enters non-orientation state as shown in FIG. 3. In this case, any problem does not arise because the device is not used. Display is provided by turning on the power supply and continuously applying an electric field as shown in FIGS. 1(*a*) and 1(*b*), so that the state never returns to the non-orientation of FIG. 3 during operation.

Furthermore, Japanese Unexamined Patent Application No. 5990/1996 (Tokukaihei 8-5990) also discloses a method of orientating liquid crystal by using an electric field; however, the technique is distinct from the present embodiment in construction because opposing electrodes are paired in parallel, that is, comb-shaped electrodes. Also, an electric field is applied between the comb-shaped electrodes on each substrate, and electric fields are respectively applied in parallel with the substrates so as to control orientation. Additionally, the orientation is controlled by an electric field during a non-driving state, that is, during a non-display state. Namely, the technique is devised for preparing display. Thus, unlike the present embodiment, the technique does not simultaneously perform orientation and driving by using an electric field.

Furthermore, the following examples describe the detail of the present invention.

EXAMPLE 1

As an example of the present invention, a liquid crystal display device is manufactured as follows. A TFT element is formed on a glass substrate and is brought into contact with a transparent electrode ITO having a thickness of 1000 Å so as to form a switching electrode. A transparent electrode ITO having a thickness of 1000 Å is formed on another glass substrate, and a $Ta_2O_5$, film is formed with a thickness of 2000 Å thereon. A plurality of Ta lines are formed as sub electrodes with a thickness of 1000 Å. The sub electrode is 5 $\mu$m in width and 20 $\mu$m in interval. After cleaning the two substrates, the substrates are bonded to each other without forming an orientation film so as to complete a cell shown in FIG. 2. The cell is 3 $\mu$m in thickness.

Nematic liquid crystal E8 manufactured by Merck & Co., Inc. is filled therein. Its Dielectric anisotropy is positive. When the liquid crystal cell is observed with two polarizers arranged in crossed Nicols, it is found that unevenness became more visible because orientation has not been performed to produce even orientation.

Next, as shown in FIGS. 1(*a*) and 1(*b*), opposing electrodes are grounded at a ground level, and the sub electrodes keep receiving an electric field signal with a rectangular waveform of 120 Hz and ±5 V. As shown in FIG. 1(*a*), when a rectangular waveform of 120 Hz and ±5 V, that is in phase with the sub electrode, is applied to the switching electrode, transmitting light disappears and even darkness appears. When the liquid crystal cell is observed with two polarizers arranged in crossed Nicols, it is confirmed that extinction remains regardless of a setting angle between the cell and polarizers and that liquid crystal is vertically oriented. Subsequently, as shown in FIG. 1(*b*), when a rectangular waveform of 120 Hz and ±5 V, that has an opposite phase of the sub electrode, is applied to the switching electrode, transmitting light appears so as to have brightness.

While switching a polarity of an electric field applied to the switching electrode as described above in order to switch between darkness with vertical orientation and brightness generating transmitting light, response speed is measured regarding rising response (change from darkness to brightness) and falling response (change from brightness to darkness). The rising response and the falling response are 2 ms. Hence, fast response is available both on rising and falling without causing a conventional problem in which one response is fast but the other is slow.

The cell manufactured in the present example does not require orientation after the substrate is formed. The cell can be bonded together only if cleaning is finished. It is therefore possible to readily manufacture the cell and remarkably lower the manufacturing cost.

EXAMPLE 2

A liquid crystal display device is manufactured in the same manner as Example 1 except that vertical orientation is performed on substrates. When the liquid crystal cell is observed with two polarizers arranged in crossed Nicols, it is confirmed that a dark field appears all the time and vertical orientation occurs.

Further, as shown in FIGS. 1(*a*) and 1(*b*), opposing electrodes are set at a ground level, and the sub electrodes keep receiving an electric field signal with a rectangular waveform of 120 Hz and ±5 V. As shown in FIG. 1(*b*), when a rectangular waveform of 120 Hz and ±5 V, that has an opposite phase of the sub electrode, is applied to the switching electrode, transmitting light appears so as to have brightness. Subsequently, as shown in FIG. 1(*a*), when a rectangular waveform of 120 Hz and ±5 V, that is in phase with the sub electrode, is applied to the switching electrode, it is confirmed that a dark field appears all the time and vertical orientation reappears even when the cell is rotated between the crossed Nicols polarizers.

While switching a polarity of an electric field applied to the switching electrode as described above in order to switch between darkness with vertical orientation and brightness generating transmitting light, response speed is measured regarding rising response (change from darkness to brightness) and falling response (change from brightness to darkness). The rising response is 2.5 ms and the falling response is 1.5 ms. Consequently, the falling response is faster than that of Example 1; meanwhile, the rising response is slightly slower.

The rising response, which changes from vertical orientation to the orientation of FIG. 1(*b*) by resisting orientation regulating force of the substrate, is slightly slower than a non-orientation state because initial orientation is vertical one. However, the response state is the same as that of a conventional liquid crystal display device; namely, the rising response does not become slower than the conventional art.

In contrast, when vertical orientation reappears, switching energy of an electric field is added to a conventional change resulted from a reduction in viscosity, so that the response is further faster than non-orientation state.

Unlike Example 1, the rising response and the falling response differ in speed; however, a problem does not arise in which one response is fast but the other is slow. Fast response is available both at rising and falling.

EXAMPLE 3

A number of the structures shown in Example 1 are formed on a single substrate so as to manufacture an active-matrix panel. When an impulse display is provided by using the foregoing flashing backlight, it is found that a tailing ball frequently observed in a sports program can be eliminated on a liquid crystal television, thereby improving ability of reproducing a moving image.

EXAMPLE 4

A number of the structures shown in Example 2 are formed on a single substrate so as to manufacture an active-matrix panel. When an impulse display is provided by using the foregoing flashing backlight, it is found that a tailing ball frequently observed in a sports program can be eliminated on a liquid crystal television, thereby improving ability of reproducing a moving image.

EMBODIMENT 2

Referring to FIGS. 4($a$) to 7, the following explanation describes another embodiment of the present invention. Here, for convenience, those members that have the same function as those shown in the figures of the previous embodiment are indicated by the same reference numerals and the explanation thereof is omitted.

The present embodiment is described in detail as follows by referring to the figures. FIGS. 4($a$) and 4($b$) are sectional views schematically showing a liquid crystal display device of the present embodiment. A first substrate includes an electrode (switching electrode) 44 which is connected to a switching element such as a TFT and an electrode (sub electrode) 43 which is not connected to the switching element. These electrodes are brought into contact with a high resistor (resistant film) 42. The switching electrode 44 and the sub electrode 43 are provided for generating an electric field in a lateral direction. An opposing electrode 41 is disposed on a second substrate but is not connected to the switching element.

At least one of the high resistor 42 and the opposing electrode 41 that constitute a pixel is a transparent electrode. The electrodes 43 and 44 may be composed of a transparent electrode or an opaque electrode such as a metallic electrode. As discussed in 'D. J. Channin et al., Applied Physics Letters, Vol. 28, (1976) p. 300, "Rapid Turn-off in triode optical gate liquid crystal devices", the high resistor is a sheet resistor of $10^7$ to $10^9$ $\Omega/\square$. It is possible to adopt a thin film made of a material such as silicon, carbon, and ITO with a thickness of about 100 Å. Transition time from FIG. 4($a$) to FIG. 4($b$) is rising time $\tau r$, and transition time from FIG. 4($b$) to FIG. 4($a$) is falling time $\tau d$.

In the following explanation, the dielectric anisotropy of nematic liquid crystal is positive, and as shown in FIGS. 4($a$) and 4($b$), voltage is applied to the electrodes in the present embodiment by setting the opposing electrode 41 at a ground level and successively applying ac signals to the electrode 43, which is not connected to the switching element. As shown in FIG. 4($a$), when the electrode 44 connected to the switching element (TFT, etc.) receives a signal whose polarity is reversed from a signal applied to the electrode 43, an electric field 14 indicated by an arrow appears in a substrate horizontal direction between the electrodes 43 and 44. Thus, liquid crystal molecules 11 change their orientation in an electric field direction so as to make horizontal orientation.

As shown in FIG. 4($b$), when a signal of the electrode 44, which is connected to the switching element, is reversed and a signal having the same polarity as the electrode 43 is applied, the horizontal electric field 14 between the electrodes 43 and 44 disappears so as to generate an electric field perpendicularly to the substrate between the electrodes 43 and 44 and a ground level of the opposing electrode 41. On a pixel part between the electrodes 43 and 44, the high resistor 42 generates substantially the same electric field as the electrodes. A liquid crystal molecule changes its orientation in an electric field direction so as to make vertical orientation.

Figure 21A:
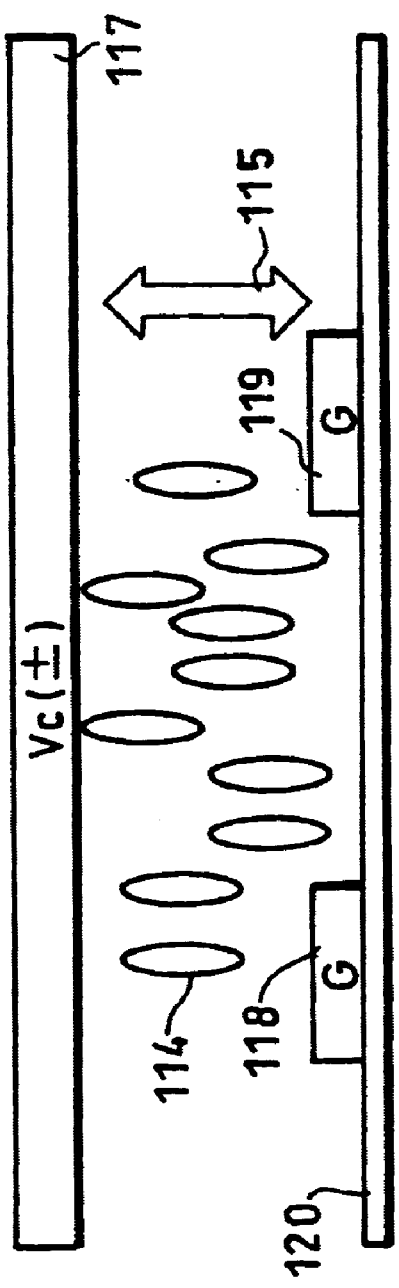
FIGS. 21(a) and 21(b) are explanatory drawings showing the construction of a liquid crystal display device which controls nematic liquid crystal by using a conventional multi-direction electric field.
Figure 21B:
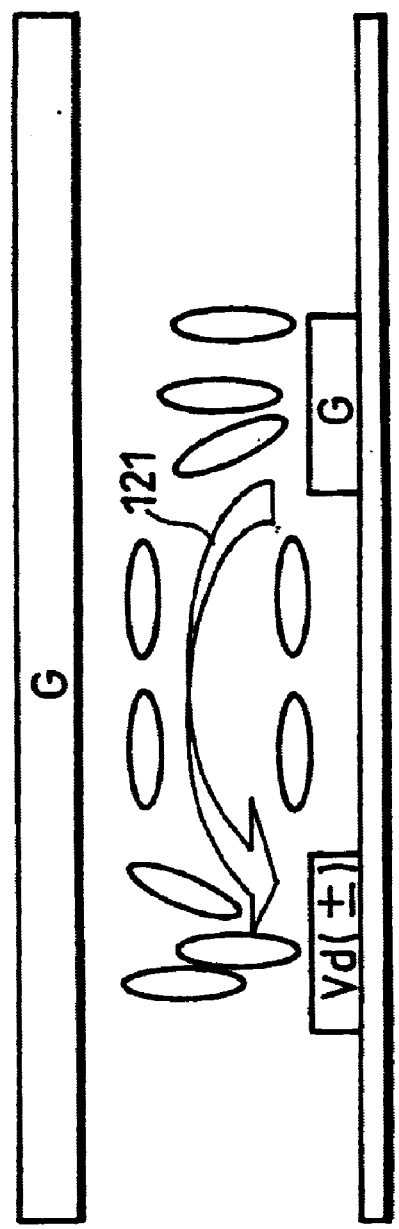
Figure 22A:
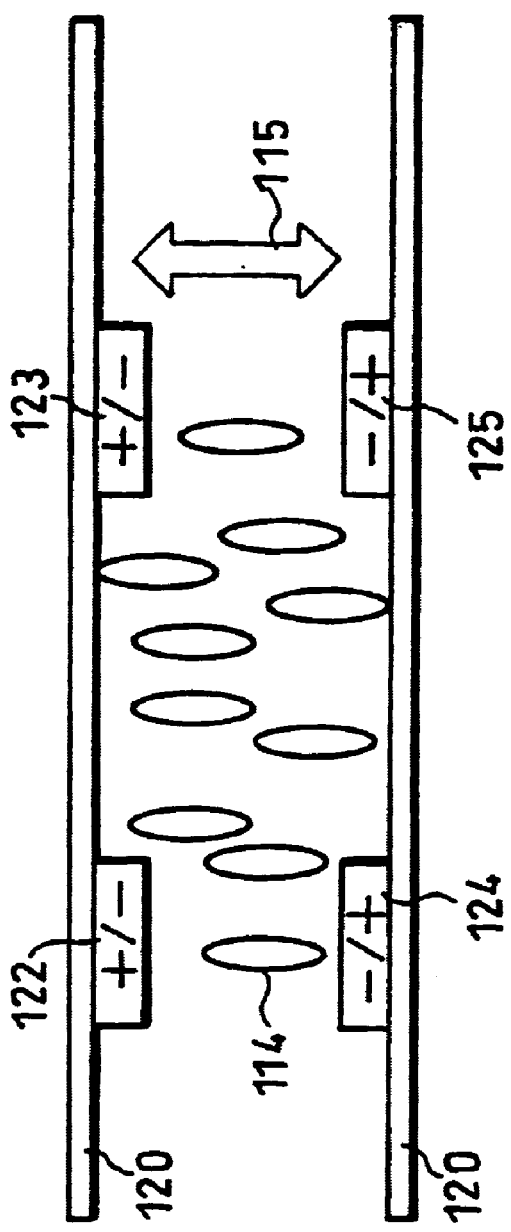
FIGS. 22(a) and 22(b) are explanatory drawings showing the construction of the liquid crystal display device which controls nematic liquid crystal by using the conventional multi-direction electric field.
Figure 22B:
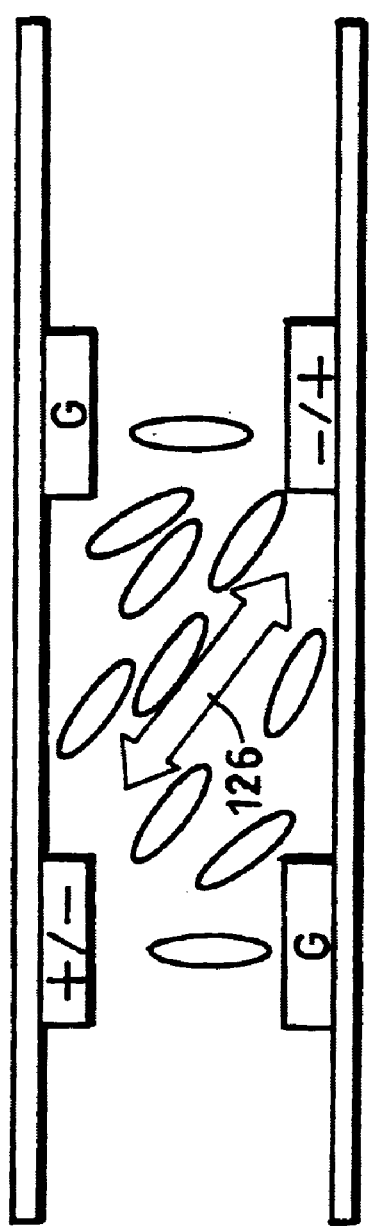

In the present embodiment, in the same manner as the conventional methods shown in FIGS. 21($a$) to 22($b$), rising response and falling response are both controlled by an electric field and no falling is caused by a reduction in viscosity, so that fast response can be achieved. Moreover, although the number of switching elements for one pixel is significant in view of manufacturing cost in FIGS. 21($a$) to 22($b$), the present embodiment can solve the problem with only one switching element.

Figure 5:
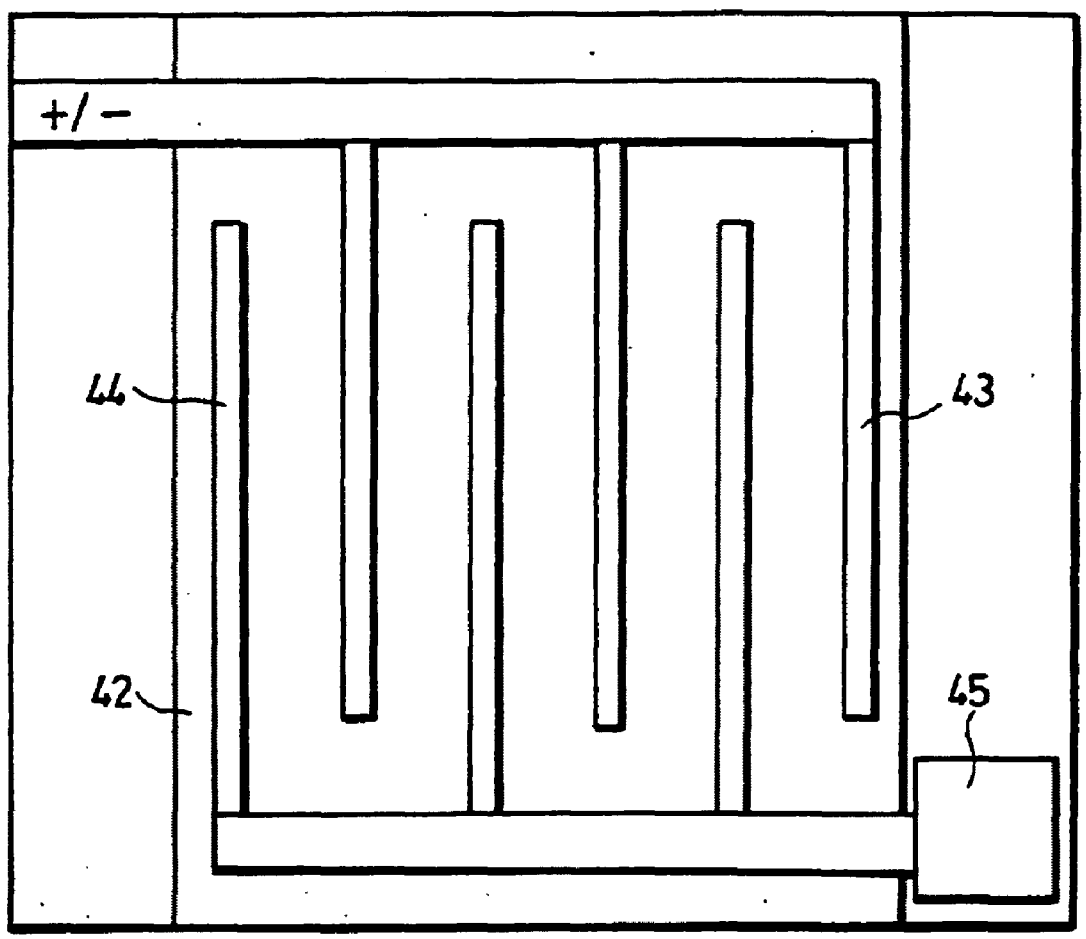
FIG. 5 is an explanatory drawing schematically showing the construction of electrodes according to the present invention.

In an actual arrangement, a liquid crystal display device is about 100 μm in pixel pitch and is about 3 to 5 μm in cell thickness. The liquid crystal display device of the present embodiment is arranged in the same manner. A comb-shaped electrode structure shown in FIG. 5 is preferable to sufficiently generate a horizontal electric field between the electrodes 43 and 44. In this case, 45 represents a TFT acting as a switching element connected to the electrode 44.

Moreover, the present embodiment does not require orientation. Normally, in a display device using nematic liquid crystal, orientation is necessary on a surface of the substrate. Conventionally, as shown in FIGS. 19($a$) and 19($b$), display is provided by switching application and non-application of an electric field. In order to achieve even orientation during non-application of an electric field, it is necessary to generate orientation regulating force by forming an orientation film or performing rubbing thereon.

Figure 6:
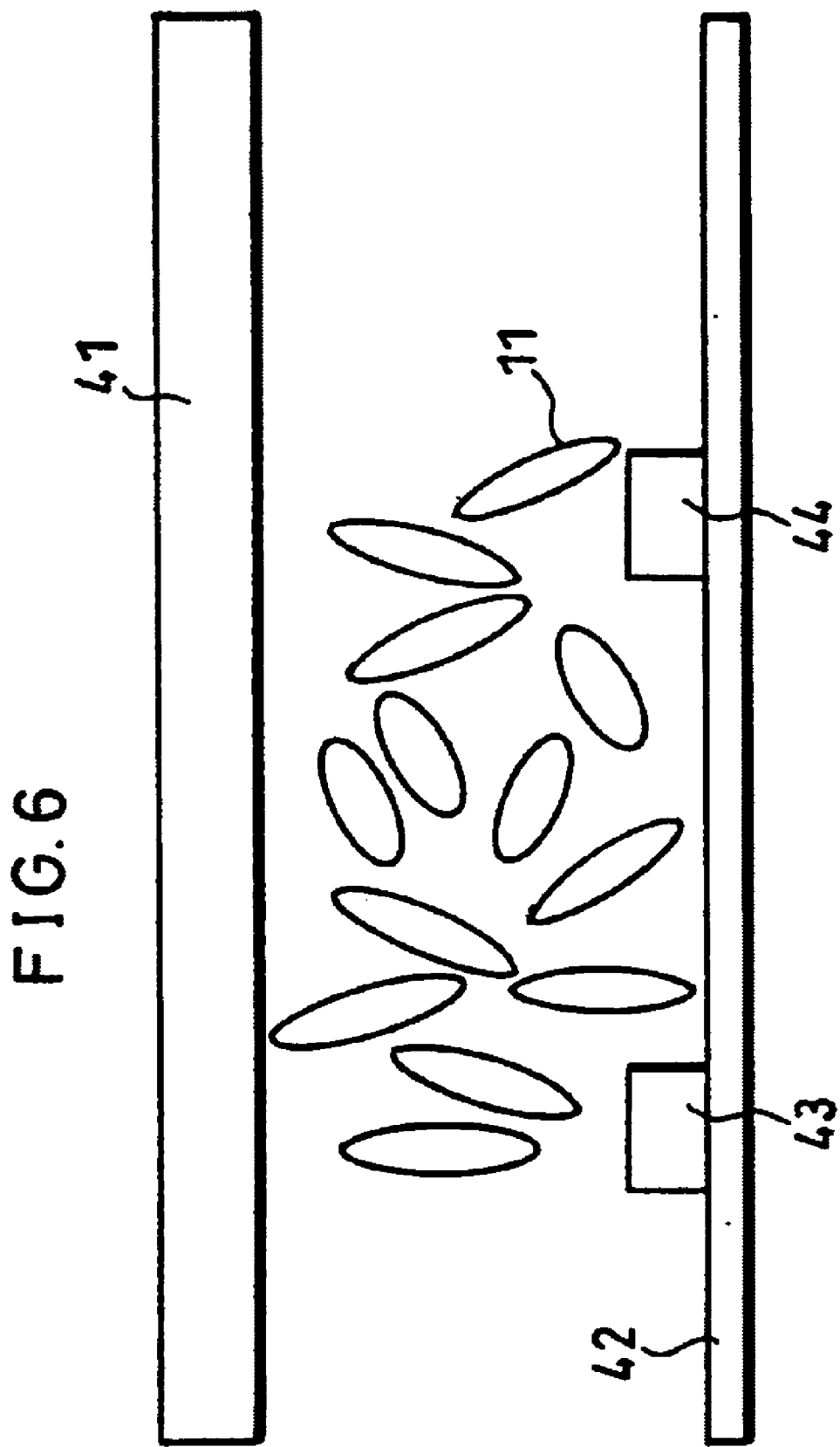
FIG. 6 is an explanatory drawing schematically showing a sectional structure of the liquid crystal display device according to the present invention.
Figure 12:
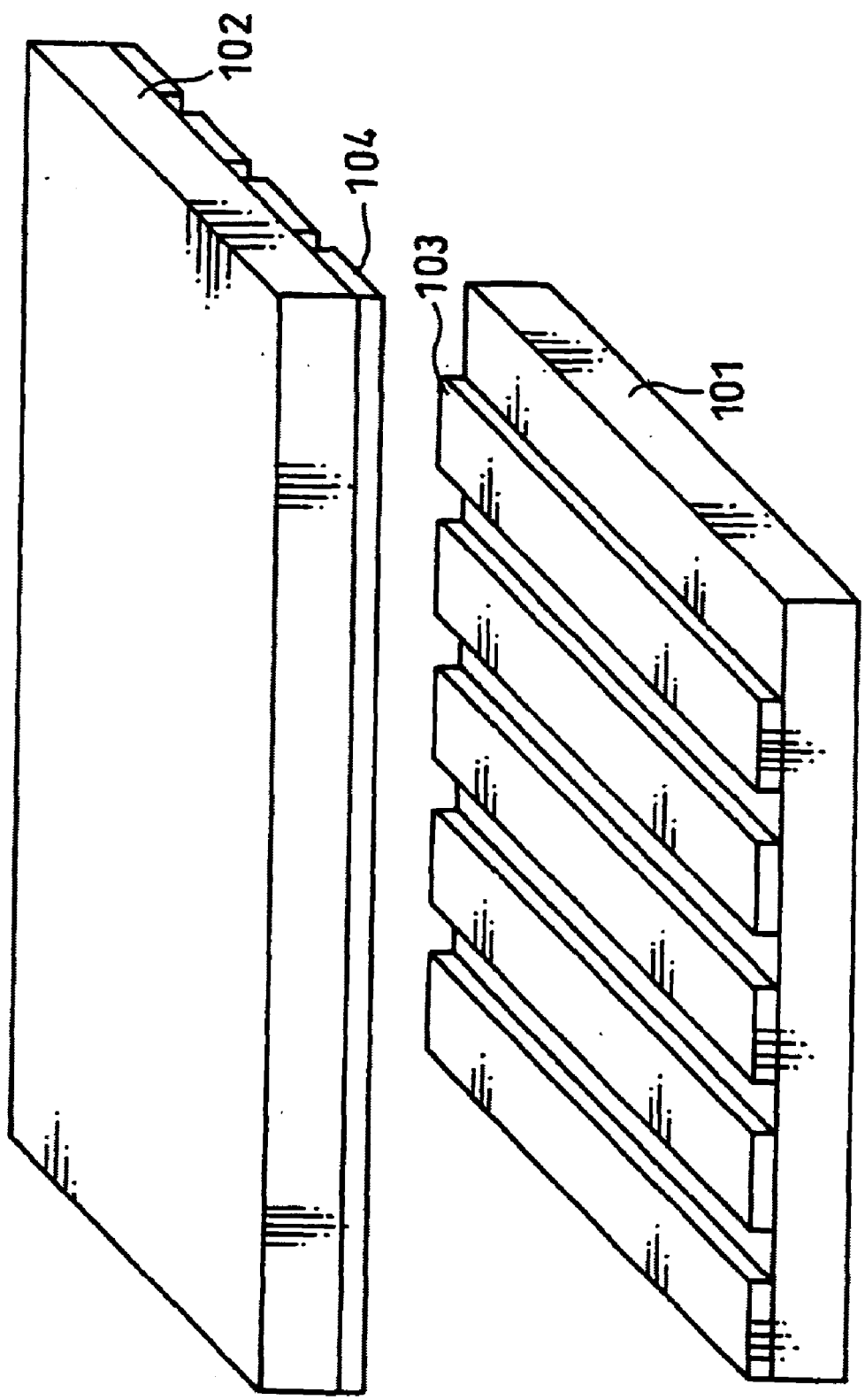
FIG. 12 is an explanatory drawing showing a basic construction of a conventional liquid crystal display device.
Figure 13:
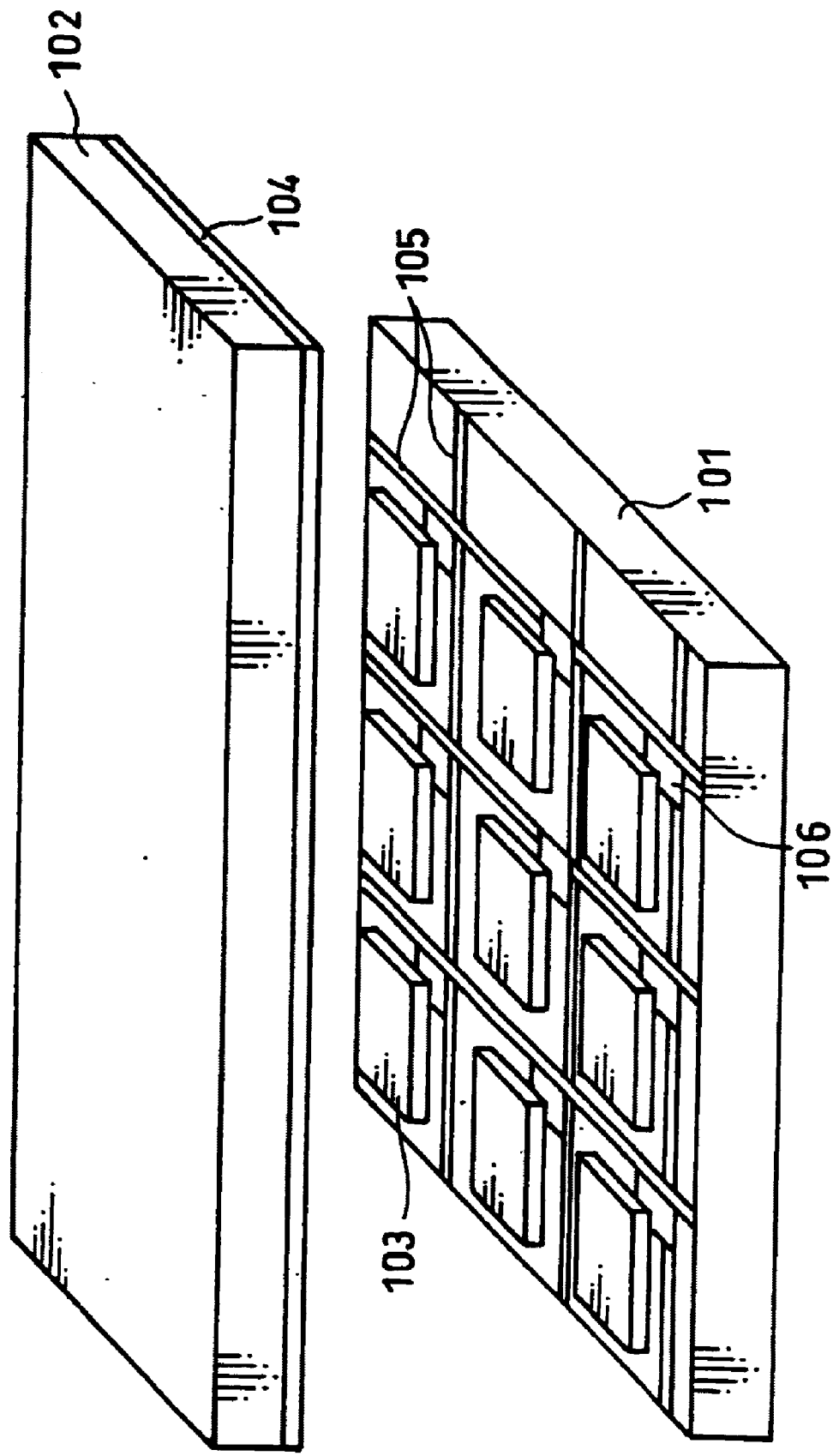
FIG. 13 is an explanatory drawing showing the basic construction of the conventional liquid crystal display device.

During application of an electric field, liquid crystal is evenly oriented by an electric field without the necessity for orientation regulating force. Thus, the display device of the present embodiment does not generate a non-application state of an electric field while providing display, so that the need for orientation can be eliminated. When the display device is turned off, liquid crystal is in a non-orientation state as shown in FIG. 6; however, any problem does not arise because the device is not operated. Display is provided by turning on the power supply and continuously applying an electric field during operation as shown in FIG. 12, so that the state never returns to the non-orientation of FIG. 13 during operation.

Furthermore, Japanese Unexamined Patent Application No. 5990/1996 (Tokukaihei 8-5990) also discloses a method of orientating liquid crystal by an electric field; however, the technique is distinct from the present embodiment in construction because opposing electrodes are paired in parallel, that is, comb-shaped electrodes. An electric field is reduced in a gap between the comb-shaped electrodes, so that an electric field cannot be evenly generated in a direction perpendicular to the substrate. Additionally, the orientation is controlled by applying electric fields between the comb-shaped electrodes of the substrates and applying electric fields respectively to the substrates in parallel therewith. Furthermore, the orientation control by an electric field is performed during a non-driving state, that is, during non-display state. Namely, the technique is devised for preparation of display. Thus, unlike the present embodiment, the technique does not simultaneously performs orientation and driving by an electric field. Besides, the following examples describe the detail of the present invention.

EXAMPLE 5

As an example of the present invention, a liquid crystal display device is manufactured as follows. TFT elements are formed on a glass substrate, and a thin film made of amorphous silicon is formed with a thickness of 100 Å on the same substrate. Amorphous silicon does not transmit light but has a transmissivity of 90% or more with a small thickness of 100 Å. Thus, the thin film is substantially transparent.

A film made of Mo is formed thereon with a thickness of 2000 Å so as to cover a TFT and an amorphous silicon thin film, and the Mo film is patterned into a pair of combed shapes by etching with resist and a photomask so as to form an electrode structure in which one of the combs is in contact with the TFT and the other is not in contact with the TFT. The electrode is 5 µm in width and 20 µm in interval. After cleaning the above substrate and an opposing substrate, on which a transparent electrode ITO having a thickness of 2000 Å is formed, the substrates are bonded together so as to form a cell arranged as FIGS. 4(a) and 4(b) without forming an orientation film. The cell is 3 µm in thickness. Nematic liquid crystal E8 manufactured by Merck & Co., Inc. is filled therein. The Dielectric anisotropy is positive.

When the liquid crystal cell is observed with two polarizers arranged in crossed Nicols, it is found that unevenness is quite visible because orientation is not performed to produce even orientation. As shown in FIG. 4(a), while an opposing electrode 41 is set at a ground level and a rectangular waveform signal of 120 Hz and ±5 V is applied to an electrode 43 which is not connected to the TFT, a rectangular waveform signal of 120 Hz and ±5 V, that has an opposite phase of the electrode 43, is applied to an electrode 44 connected to the TFT; thus, unevenness is eliminated and even orientation is achieved. When the cell is rotated between the crossed Nicols polarizers, it is confirmed that a dark field and a bright field are switched to each other for every 45° so as to provide horizontal orientation.

And then, as shown in FIG. 4(b), a rectangular waveform signal of 120 Hz and ±5 V, that is in phase with the electrode 43, is applied to the electrode 44 connected to the TFT. The electrode 43 is not connected to the TFT. In this case, even when the cell is rotated between the crossed Nicols polarizers, it is confirmed that only a dark field appears all the time so as to provide vertical orientation.

As earlier mentioned, while switching a polarity of an signal applied to the switching electrode 44, which is connected to the TFT, response speed is measured regarding rising response (change from horizontal orientation to vertical orientation) and falling response (change from vertical orientation to horizontal orientation). The rising response and the falling response are each 2 ms. Hence, fast response is available on rising and falling without causing a conventional problem in which one response is fast but the other is slow.

The cell manufactured in the present example does not require orientation after the substrate is formed. The cell can be bonded together only if cleaning is finished. It is therefore possible to readily manufacture the cell and to remarkably lower the manufacturing cost.

EXAMPLE 6

A liquid crystal display device is manufactured in the same manner as Example 5 except that vertical orientation is performed on both substrates. When the liquid crystal cell is observed with two polarizers arranged in crossed Nicols, it is confirmed that only a dark field appears all the time so as to provide vertical orientation.

As shown in FIG. 4(a), while an opposing electrode 41 is set at a ground level and a rectangular waveform signal of 120 Hz and ±5 V is applied to an electrode 43 which is not connected to the TFT, a rectangular waveform signal of 120 Hz and ±5 V, that has an opposite phase to the electrode 43, is applied to an electrode 44 connected to the TFT; thus, transmitting light occurs and orientation is changed. When the cell is rotated between the crossed Nicols polarizers, it is confirmed that a dark field and a bright field are switched to each other for every 45° so as to provide horizontal orientation. Subsequently, a rectangular waveform signal of 120 Hz and ±5 V, that is in phase with the electrode 43, is applied to the electrode 44 connected to the TFT. The electrode 43 is not connected to the TFT. In this case, even when the cell is rotated between the crossed Nicols polarizers, it is confirmed that only a dark field appears all the time so as to provide vertical orientation again.

As described above, while switching a polarity of a signal applied to the electrode 44 connected to the TFT, and while switching vertical orientation serving as initial orientation and horizontal orientation, response speed is, measured regarding rising response (change from a vertical orientation to horizontal orientation) and falling response (change from horizontal orientation to vertical orientation). The rising response is 2.5 ms and the falling response is 1.5 ms. Consequently, the falling response is faster than that of Example 5; meanwhile, the rising response is slightly slower.

Since initial orientation is vertical orientation, the rising response, which changes from vertical orientation to the horizontal orientation by resisting orientation regulating force, is slightly made slower than a non-orientation case due to orientation regulating force of the substrate. However, the response state is the same as that of a conventional liquid crystal display device; namely, the rising response does not become slower than the conventional art.

In contrast, in the case of a change from horizontal orientation to vertical orientation, switching energy of an electric field is added to a conventional change resulted from a reduction in viscosity, so that the response is further faster than non-orientation case.

Unlike Example 5, the rising response and the falling response differ in speed; however, a problem does not arise in which one response is fast but the other is slow. Fast response is available both at rising and falling.

EXAMPLE 7

Figure 7:
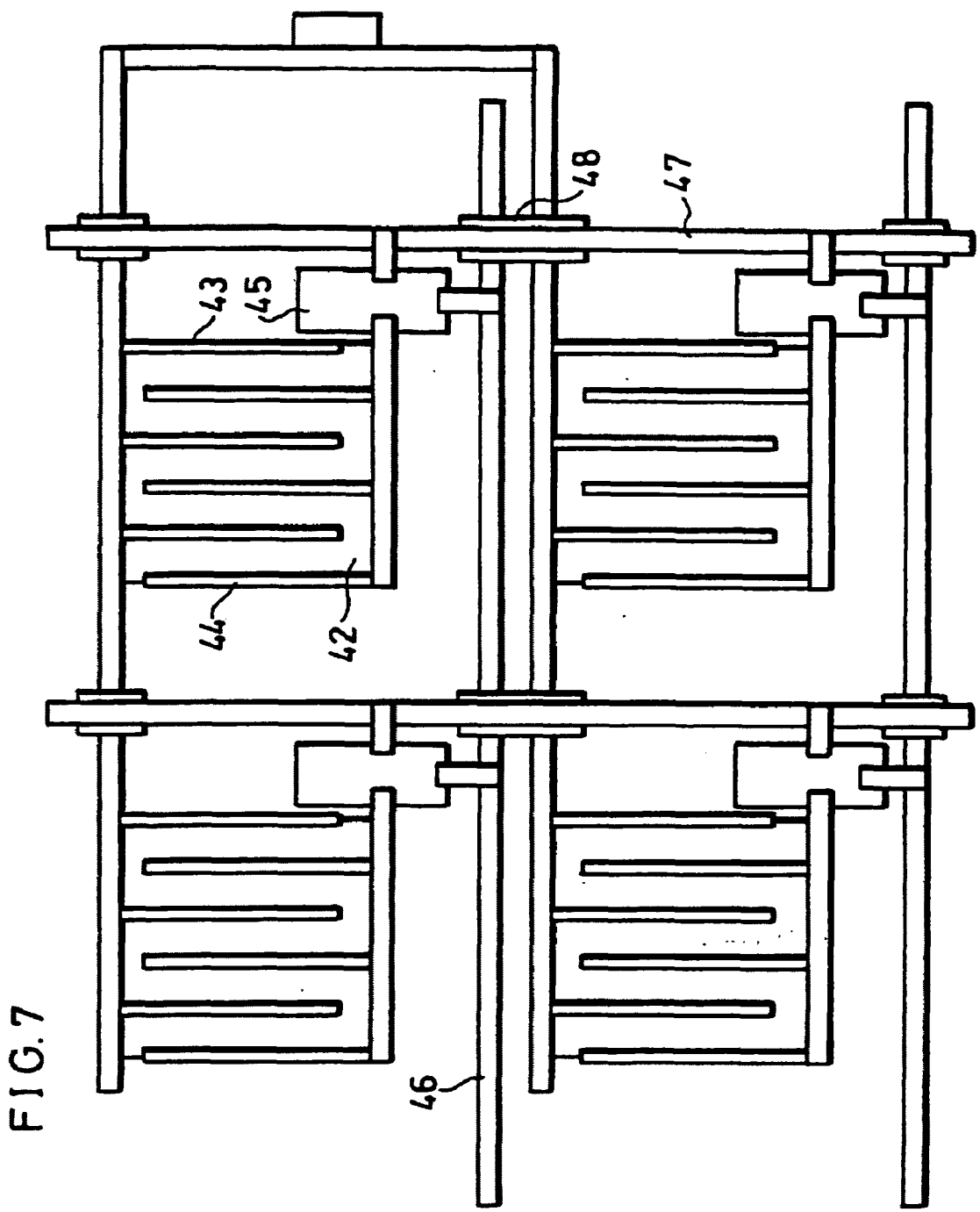
FIG. 7 is an explanatory drawing schematically showing the structure of the electrodes according to the present invention.

As shown in FIG. 7, a number of the structures shown in Example 5 are formed on a single substrate so as to manufacture an active-matrix panel. 45 represent TFTs, 46 represent gate lines, 47 represent source lines, and 48 represent insulators between the gate lines and the source lines. When an impulse display is provided by using the foregoing flashing backlight, it is found that a tailing ball frequently observed in a sports program is eliminated on a liquid crystal television, thereby improving ability of reproducing a moving image.

EXAMPLE 8

As shown in FIG. 7, a number of structures shown in Example 6 are formed on a single substrate so as to manufacture an active-matrix panel. 45 represent TFTs, 46 represent gate lines, 47 represent source lines, and 48 represent insulators between the gate lines and the source lines. When an impulse display is provided by using the foregoing flashing backlight, it is found that a tailing ball frequently observed in a sports program is eliminated on a liquid crystal television, thereby improving ability of reproducing a moving image.

EMBODIMENT 3

Figure 8A:
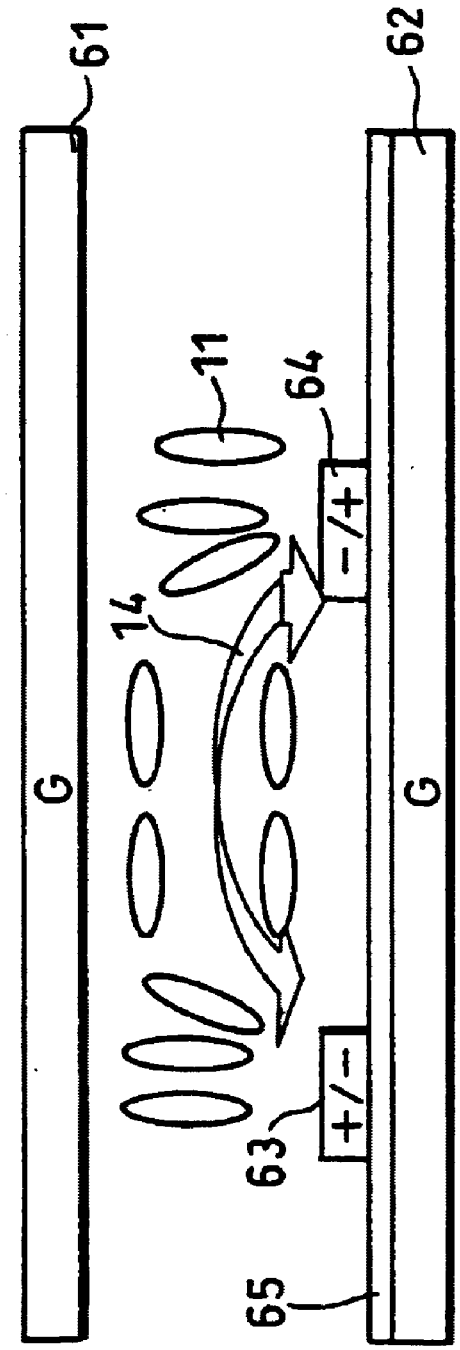
FIGS. 8(*a*) and 8(*b*) are explanatory drawings schematically showing the sectional structures of the liquid crystal display device according to the present invention.
Figure 8B:
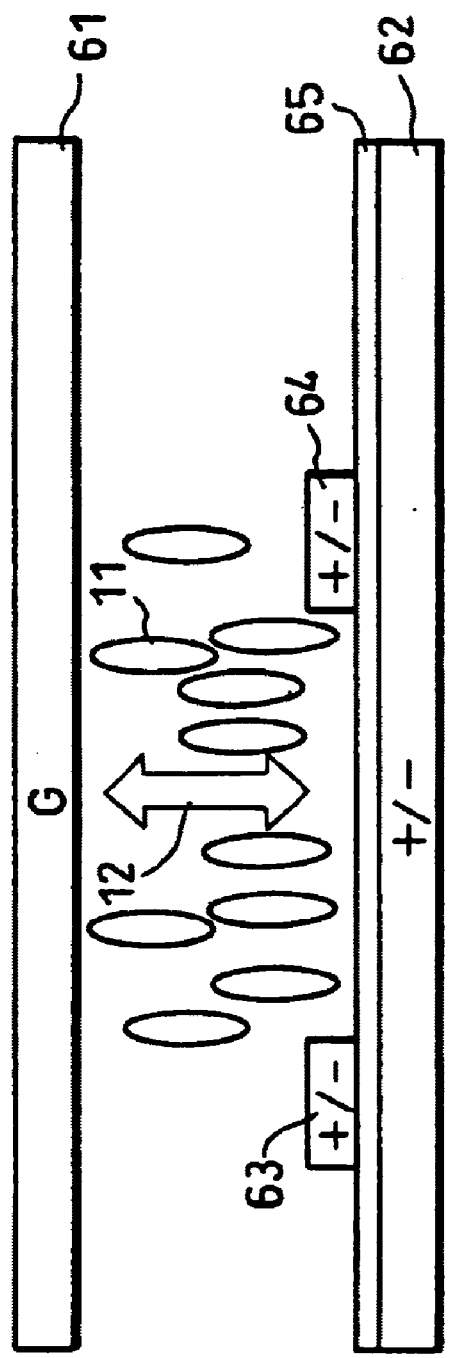

Referring to FIGS. 8(*a*) to 11, the following explanation describes still another embodiment of the present invention. Here, for convenience of explanation, those members that have the same function as those shown in the figures of the previous embodiment are indicated by the same reference numerals and the explanation thereof is omitted.

The following discusses the embodiment of the present invention by referring to the figures. FIGS. 8(*a*) and 8(*b*) are sectional views showing the construction of a liquid crystal display device according to the present embodiment. A first substrate includes an electrode (first switching electrode, first electrode) 64 which is connected to switching elements such as TFTs, and an electrode (sub electrode, third electrode) 63 which is not connected to the switching element. These electrodes are stacked on an electrode (second switching electrode, second electrode) 62, which is connected to another switching element via an insulating film (insulator) 65. An opposing electrode 61 is not connected to the switching element. At least one of the electrode 62 and the opposing electrode 61 that constitute a pixel is a transparent electrode, and the electrode 63 and the electrode 64 may be transparent electrodes or opaque electrodes such as metallic electrodes. Transition time from FIG. 8(*a*) to FIG. 8(*b*) is rising time τr, and transition time from FIG. 8(*b*) to FIG. 8(*a*) is falling time τd.

Hereinafter, for convenience of explanation, nematic liquid crystal has positive dielectric anisotropy. According to the present embodiment, voltage is applied to the electrodes as shown in FIGS. 8(*a*) and 8(*b*) by setting the opposing electrode 61 at a ground level and successively applying ac signals to the electrode 63. As shown in FIG. 8(*a*), a signal whose polarity is reversed from the electrode 63 is applied to the electrode 64 (in this case, the electrode 62 is kept at a ground level), and then, an electric field appears between the electrodes 63 and 64 in a substantially horizontal direction to a surface of the substrate; thus, liquid crystal molecules 11 are horizontally oriented.

As shown in FIG. 8(*b*), a polarity of a signal applied to the electrode 64 is reversed, and the same signal is applied to the electrode 62, so that the horizontal electric field disappears between the electrodes 63 and 64, and a vertical electric field appears between the ground level of the opposing electrode 61 and the electrodes 63 and 64; thus, liquid crystal molecules 11 are vertically oriented. Namely, signals applied to the electrode 62 and the electrode 64 are controlled respectively by their switching elements so as to repeat a change in orientation between FIGS. 8(*a*) and 8(*b*).

In the present embodiment, in the same manner as shown in FIGS. 21(*a*) to 22(*b*), both rising response and falling response are controlled by an electric field and no falling response is caused by a reduction in viscosity, thereby achieving fast response. Also, unlike the arrangement of FIGS. 21(*a*) to 22(*b*), it is not necessary to form switching elements on both of the substrates but only one of the substrates.

Moreover, unlike the methods shown in FIGS. 21(*a*) and 22(*a*), in which a resistant thin film with a high resistance applies an electric field to most of a pixel, the electrode 62 and the opposing electrode 61 directly apply an electric field, so that little deformation appears on a signal waveform. Furthermore, it is possible to form an insulating film by depositing a material such as $Ta_2O_5$ with a thickness of 1000 to 2000 Å. Hence, it is possible to readily form an even film as compared with the resistant thin film shown in FIGS. 21(*a*) to 22(*b*).

Figure 9:
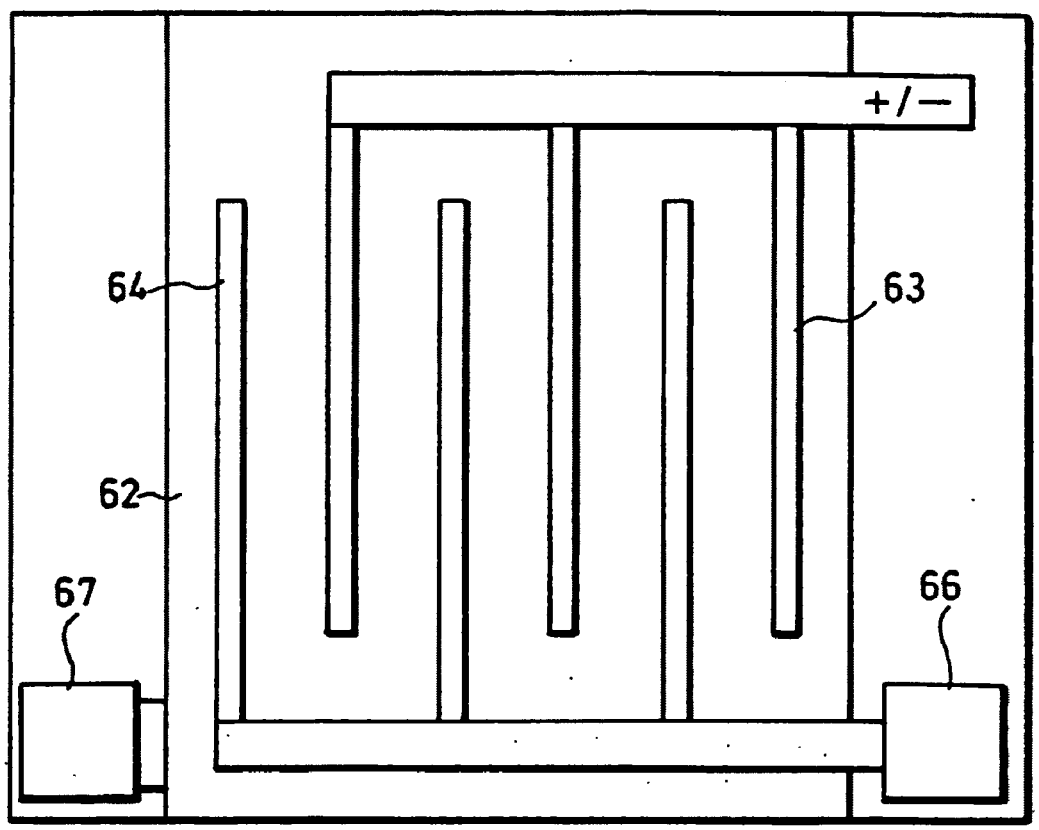
FIG. 9 is an explanatory drawing schematically showing the construction of the electrodes according to the present invention.

In an actual arrangement, a liquid crystal display deice is about 100 μm in pixel pitch and is about 5 μm in cell thickness. Since a sufficient horizontal electric field hardly appears between the electrodes 63 and 64, a comb-shaped electrode structure of FIG. 9 is preferably provided. In FIG. 9, 66 represents a TFT acting as a switching element connected to the electrode 64, and 67 represents a TFT acting as a switching element connected to the electrode 62.

Besides, the present embodiment does not require orientation. It is generally necessary to perform orientation on a surface of a substrate in a display device using nematic liquid crystal. As shown in FIGS. 19(*a*) and 19(*b*), display has been conventionally provided by switching application and non-application of an electric field. In order to achieve even orientation during non-application of an electric field, it is necessary to generate orientation regulating force by forming an orientation film or performing rubbing thereon.

Figure 10:
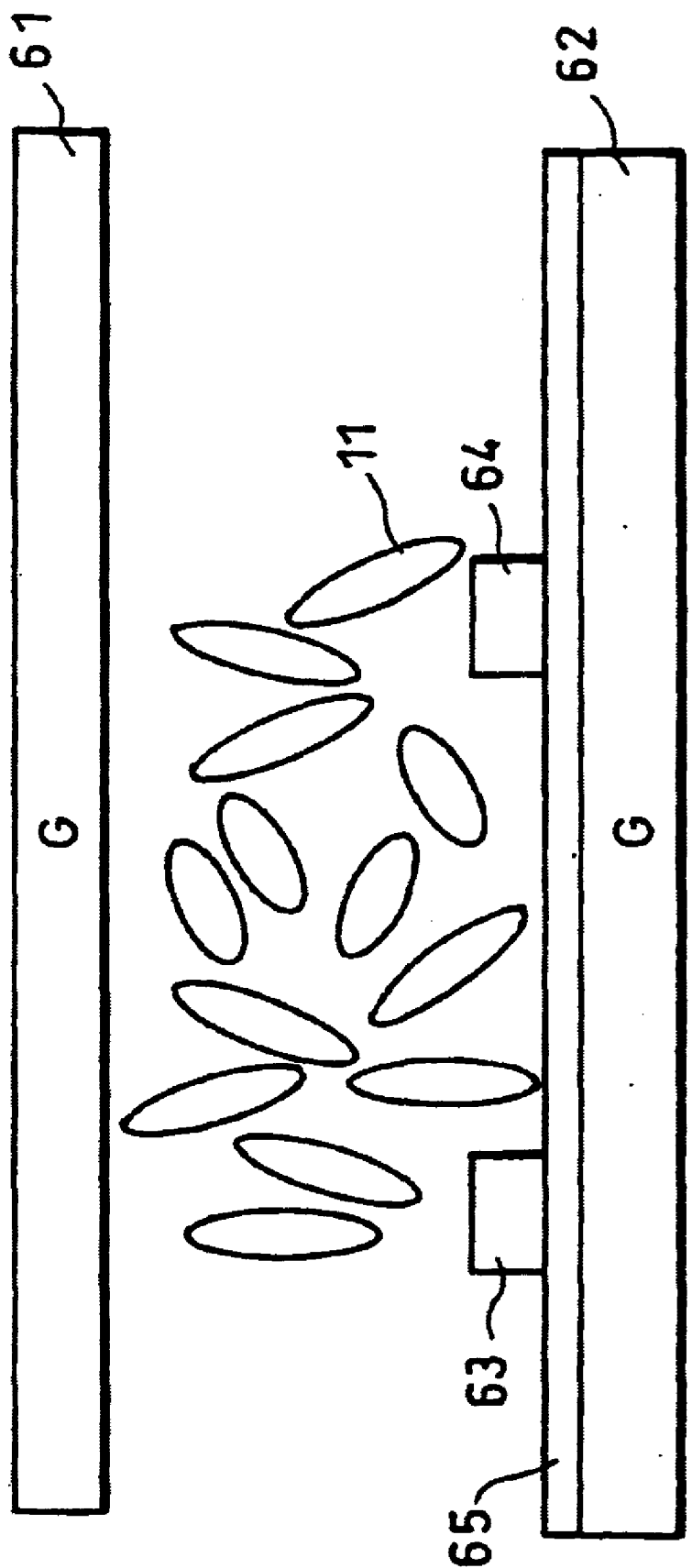
FIG. 10 is an explanatory drawing schematically showing the sectional structure of the liquid crystal display device according to the present invention.

In the present embodiment, during application of an electric field, liquid crystal is evenly oriented by an electric field without the necessity for orientation regulating force. Thus, the display device of the present embodiment does not generate a non-application state of an electric field while providing display, so that the need for orientation can be eliminated. When the display device is turned off, liquid crystal is in a non-orientation state as shown in FIG. 10; however, any problem does not arise because the device is not operated. Display is provided by turning on the power supply and continuously applying an electric field during operation as shown in FIGS. 8(*a*) and 8(*b*), so that the state never returns to the non-orientation state of FIG. 10 during operation.

Furthermore, Japanese Unexamined Patent Application No. 5990/1996 (Tokukaihei 8-5990) also discloses a method of orientating liquid crystal by an electric field; however, the technique is distinct from the present embodiment in construction because opposing electrodes are paired in parallel, that is, comb-shaped electrodes. Also, an electric field is applied between the comb-shaped electrodes on each substrate, and electric fields are respectively applied in parallel with the substrates so as to control orientation. Additionally, the orientation is controlled by an electric field during a non-driving state, that is, during a non-display status. Namely, the technique is devised for preparing display. Thus, unlike the present embodiment, the technique does not simultaneously perform orientation and driving by an electric field.

Figure 14:
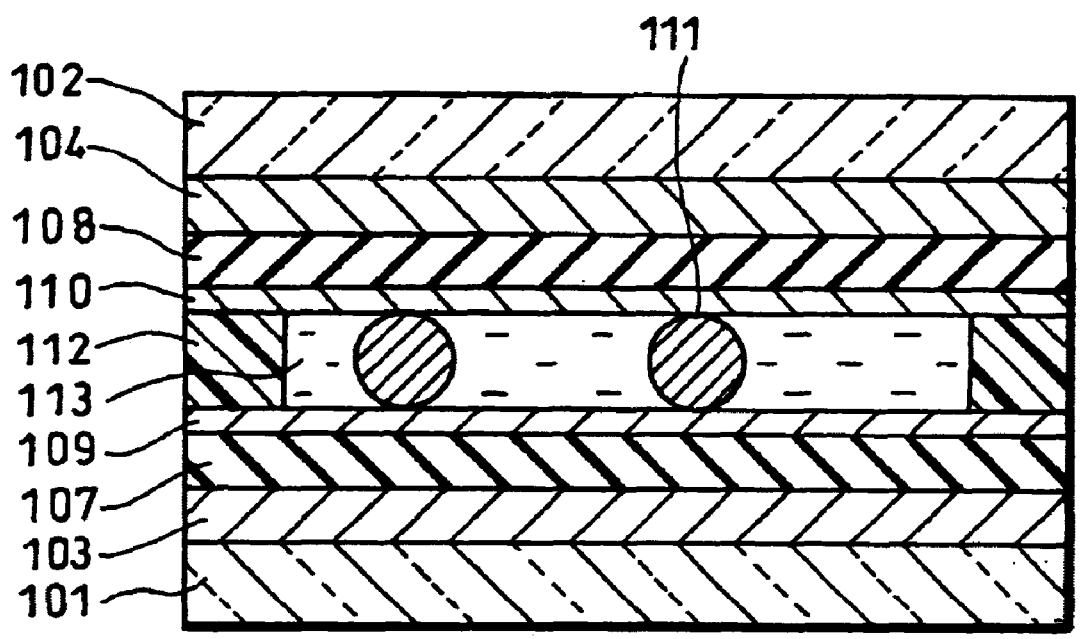
FIG. 14 is an explanatory drawing showing the basic construction of the conventional liquid crystal display device.
Figure 15:
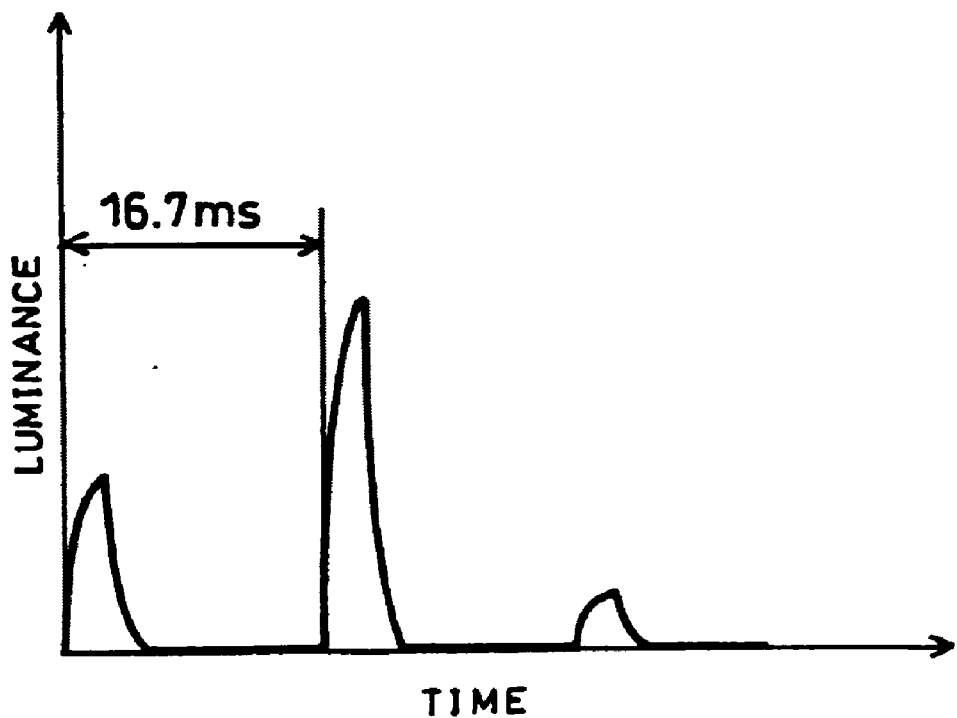
FIG. 15 is an explanatory drawing showing a cause of a blurred moving image and a method of providing impulse-type display.
Figure 16:
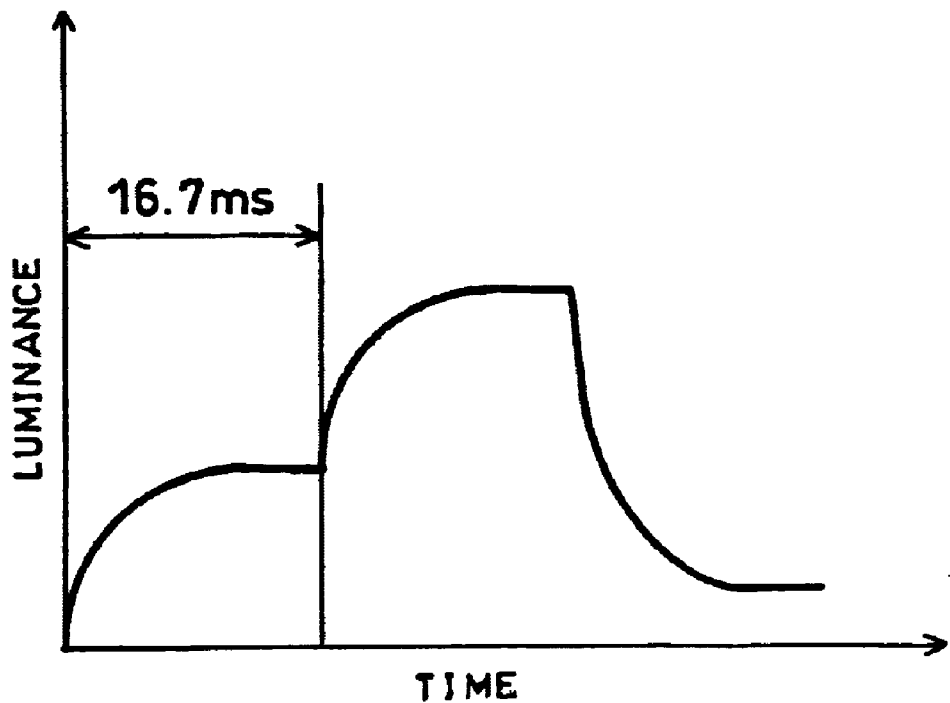
FIG. 16 is an explanatory drawing showing a cause of a blurred moving image and a method of providing hold-type display.
Figure 18:
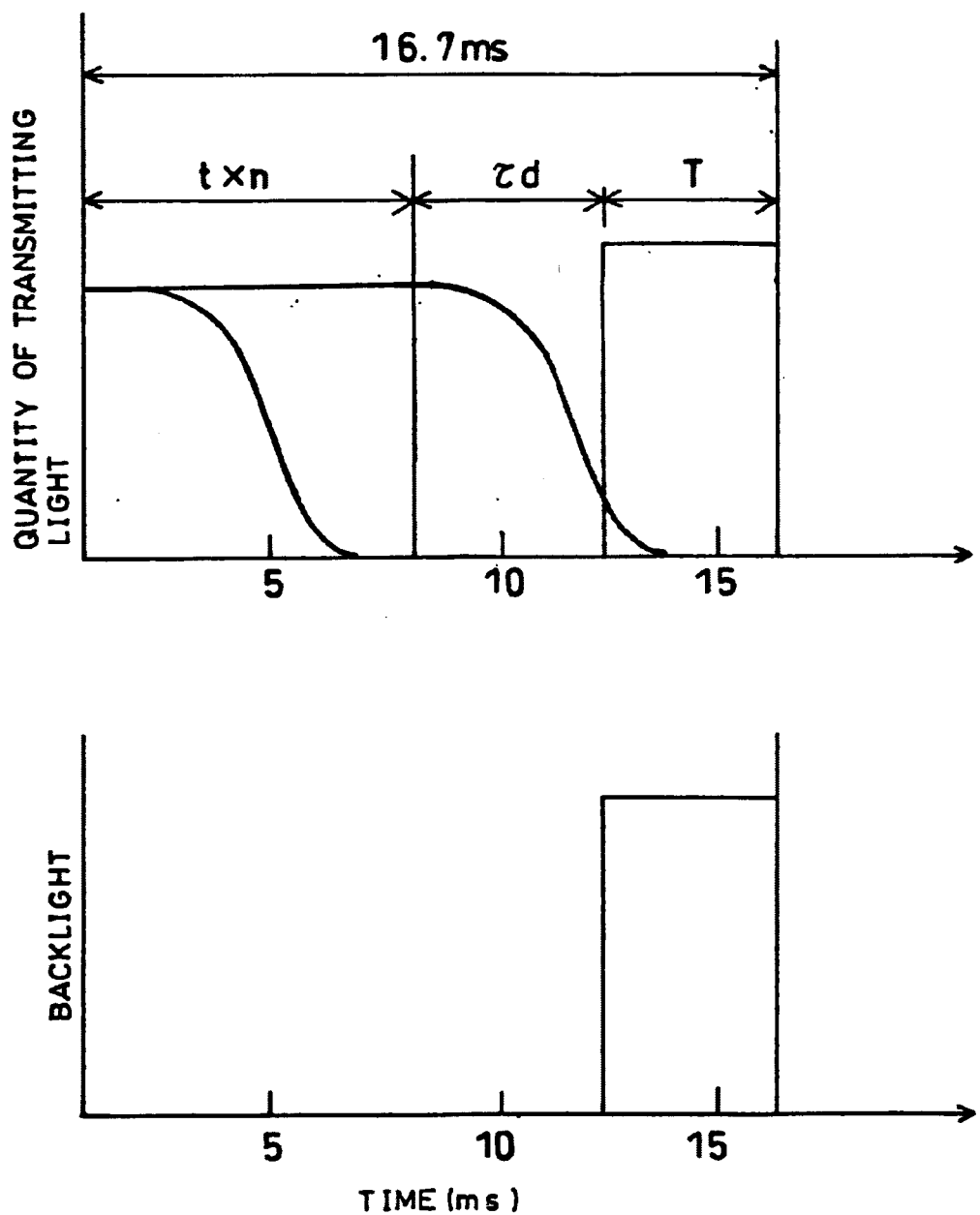
FIG. 18 is an explanatory drawing showing a cause of a blurred moving image and a method of providing impulse-type display on liquid crystal.

Besides, the present embodiment can be also arranged so as to form an orientation film. Namely, it is also possible to form orientation films as indicated by 109 and 110 in FIG. 14. This arrangement makes it possible to combine a step of forming an orientation film and a step of applying an electric field so as to readily change orientation of liquid crystal. For this reason, in addition to the effect of the above construction, it is possible to preferably change orientation of liquid crystal so as to preferably change display in a more simple manner with a higher degree of freedom.

Furthermore, the following examples describe the detail of the present invention.

EXAMPLE 9

As an example of the present invention, a liquid crystal display device is manufactured as follows. A TFT element is formed on a glass substrate and is brought into contact with a transparent electrode ITO having a thickness of 1000 Å so as to form an electrode 62. A $Ta_2O_5$ film is formed thereon as an insulating film with a thickness of 2000 Å.

An Mo film is formed thereon with a thickness of 2000 Å and is patterned into a combed-shape by etching with resist and a photomask so as to form a structure, in which one combed part serving as an electrode 66 is in contact with the TFT and the other combed part serving as an electrode 63 is not in contact with the TFT. The electrode is 5 μm in width and 20 μm in interval.

After cleaning the above substrate and an opposing substrate, on which a transparent electrode ITO with a thickness of 2000 Å is formed, the substrates are bonded together so as to form a cell arranged as FIGS. 8(*a*) and 8(*b*) without forming an orientation film. The cell is 3 μm in thickness. Nematic liquid crystal E8 manufactured by Merck & Co., Inc. is filled therein. The dielectric anisotropy is positive.

When the liquid crystal cell is observed with two polarizers arranged in crossed Nicols, it is found that unevenness is quite visible because orientation is not performed to produce even orientation. As shown in FIGS. 8(*a*) and 8(*b*), while an electrode 62 and an opposing electrode 61 are set at a ground level and a rectangular waveform signal of 120 Hz and ±5 V is applied to the electrode which is not in contact with the TFT, a rectangular waveform signal of 120 Hz and is ±5 V, that has an opposite phase, is applied to the electrode being in contact with the TFT as shown in FIG. 8(*a*); thus, unevenness is eliminated and even orientation is achieved. When the cell is rotated between the crossed Nicols polarizers, it is confirmed that a dark field and a bright field are switched to each other for every 45° so as to provide horizontal orientation.

And then, a polarity is reversed as shown in FIG. 8(*b*) regarding a signal applied to the electrode which is in contact with the TFT, and the same signal is applied to the electrode 62 so as to apply a signal of 120 Hz and ±5 V to the electrode 62, the electrode 63, and the electrode 64. Hence, even when the cell is rotated between the crossed Nicols polarizers, it is confirmed that a dark field appears all the time so as to provide vertical orientation.

As described above, while switching horizontal orientation and vertical orientation, response speed is measured regarding rising response (change from horizontal orientation to vertical orientation) and falling response (change from vertical orientation to horizontal orientation). The rising response and the falling response are each 2 ms. Hence, fast response is available on rising and falling without causing a conventional problem in which one response is fast but the other is slow.

The cell manufactured in the present example does not require orientation after the substrate is formed. The cell can be bonded together only if cleaning is finished. It is therefore possible to readily manufacture the cell and remarkably lower the manufacturing cost.

EXAMPLE 10

A liquid crystal display device is formed in the same manner as Example 9 except that vertical orientation is performed on both substrates.

When the liquid crystal cell is observed with two polarizers arranged in crossed Nicols, it is found that a dark field appears all the time so as to provide vertical orientation. As shown in FIGS. 8(*a*) and 8(*b*), while an electrode 62 and an opposing electrode 61 are set at a ground level and a rectangular waveform signal of 120 Hz and ±5 V is applied to the electrode which is not connected to the TFT, a rectangular waveform signal of 120 Hz and ±5 V, that has an opposite phase, is applied to the electrode connected to the TFT as shown in FIG. 8(*a*); thus, transmitting light appears and orientation is changed. When the cell is rotated between the crossed Nicols polarizers, it is confirmed that a dark field and a bright field are switched to each other for every 45° so as to provide horizontal orientation.

And then, a polarity is reversed as shown in FIG. 8(*b*) regarding a signal applied to the electrode which is connected with the TFT, the same signal is applied to the electrode 62, and a signal of 120 Hz and ±5 V is applied to the electrode 62, the electrode 63, and the electrode 64. Hence, even when the cell is rotated between the crossed Nicols polarizers, it is confirmed that a dark field appears all the time so as to provide vertical orientation.

While switching horizontal orientation and vertical orientation, response speed is measured regarding rising response (change from vertical orientation to horizontal orientation) and falling response (change from horizontal orientation to vertical orientation). The rising response is 2.5 ms and the falling response is 1.5 ms. Consequently, the falling response is faster than that of Example 9; meanwhile, the rising response is slightly slower.

Since initial orientation is vertical orientation, the rising response, which changes from vertical orientation to the horizontal orientation by resisting orientation regulating force, is slightly made slower than a non-orientation case due to orientation regulating force of the substrate. However, this response state is the same as that of a conventional liquid crystal display device; namely, the rising response does not become slower than the conventional art.

In contrast, in the case of a change from horizontal orientation to vertical orientation, switching energy of an electric field is added to a conventional change caused by a reduction in viscosity, so that the response is further faster than non-orientation case.

Unlike Example 9, the rising response and the falling response differ in speed; however, any problem does not arise in which one response is fast but the other is slow. Fast response is available both at rising and falling.

EXAMPLE 11

Figure 11:
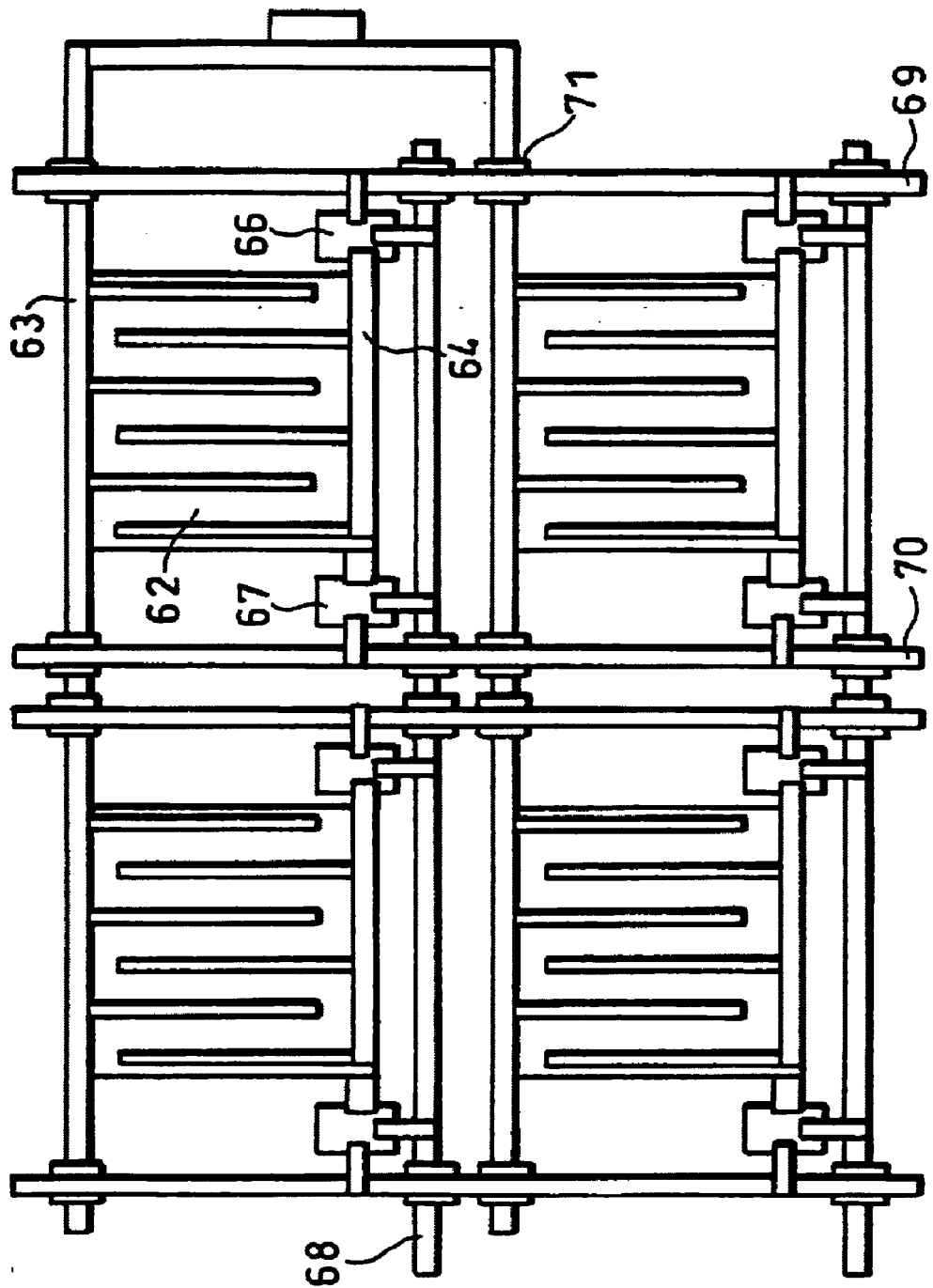
FIG. 11 is an explanatory drawing schematically showing the construction of the electrodes according to the present invention.

As shown in FIG. 11, a number of the structures shown in Example 9 are formed on a single substrate so as to manufacture an active-matrix panel. 68 represents gate lines, 69 and 70 represent source lines, and 71 represents insulators between gate and source lines.

When an impulse display is provided by using the foregoing flashing backlight, it is found that a tailing ball frequently observed in a sports program is eliminated on a liquid crystal television, thereby improving ability of reproducing a moving image.

EXAMPLE 12

As shown in FIG. 11, a number of the structures shown in Example 10 are formed on a single substrate so as to manufacture an active-matrix panel. 68 represents gate lines, 69 and 70 represent source lines, and 71 represents insulators between gate and source lines.

When an impulse display is provided by using the foregoing flashing backlight, it is found that a tailing ball frequently observed in a sports program is eliminated on a liquid crystal television, thereby improving ability of reproducing a moving image.

Moreover, with the above arrangement, the liquid crystal display device of the present invention may be arranged such that liquid crystal formed in a gap between a pair of the substrates enters a non-orientation state when an electric field is not applied and the liquid crystal enters an orientation state when an electric field is applied.

According to the above arrangement, a non-orientation state appears when an electric field is not applied, and an orientation state appears when an electric field is applied.

Therefore, without the necessity for the step of orientating a surface of the substrate, that is necessary for a normal nematic liquid crystal display device, it is possible to control the orientation of liquid crystal. Hence, in addition to the effect of the above arrangement, it is possible to simplify the manufacturing process of a liquid crystal display device and to provide a quite inexpensive liquid crystal display device.

Further, with the above arrangement, the liquid crystal display device of the present invention may be arranged such that liquid crystal formed in a gap between a pair of the substrates enters a non-application state when an electric field is not applied, and horizontal orientation, vertical orientation, and intermediate orientation may be switched by applying an electric field in a substantially horizontal direction to the substrate and applying an electric field vertically to the substrate.

According to the above arrangement, liquid crystal sandwiched between a pair of the substrates enters a non-application state when no electric field is applied, and the liquid crystal enters a horizontal orientation state, a vertical orientation state, and an intermediate orientation state by applying an electric field in a substantially horizontal direction to the surface of the substrate and applying an electric field vertically to the surface of the substrate.

Additionally, an electric field is applied in a substantially horizontal direction to the substrate or in a vertical direction to the substrate so as to generate a horizontal orientation and vertical orientation. Moreover, it is possible to realize a non-orientation state when an electric field is not applied, thereby effectively preventing burn.

For this reason, without the necessity for the step of orientating a surface of the substrate, that is necessary for a normal nematic liquid crystal display device, it is possible to control the orientation of liquid crystal. Hence, in addition to the effect of the above arrangement, it is possible to simplify the manufacturing process of a liquid crystal display device and to provide a quite inexpensive liquid crystal display device.

Besides, in addition to the above arrangement, the liquid crystal display device of the present invention, in which liquid crystal is formed in a gap between a pair of the substrates including at least a single light-transmitting substrate, may be arranged such that an orientation film is further provided between a pair of the substrates, the liquid crystal is sandwiched therebetween while no electric field is applied so as to generate vertical orientation, and an electric field is applied in a substantially horizontal direction to the substrate or in a vertical direction to the substrate so as to generate horizontal orientation, vertical orientation, and intermediate orientation.

According to the above arrangement, the orientation film is further provided between a pair of the substrates, liquid crystal is sandwiched therebetween while no electric field is applied so as to generate vertical orientation, and an electric field is applied in a substantially horizontal direction to the substrate or in a vertical direction to the substrate so as to generate horizontal orientation, vertical orientation, and intermediate orientation.

Therefore, with the combination of orientation film formation and electric field application, the orientation of liquid crystal can be more readily changed. Hence, in addition to the effect of the above arrangement, it is possible to preferably change the orientation of liquid crystal so as to preferably change the display in a more simple manner with a higher degree of freedom.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device, comprising:

liquid crystal formed in a gap between a pair of substrates including at least a single light-transmitting substrate, an electrode which is formed on said substrate to apply a signal waveform electric field from outside to liquid crystal, a mechanism which varies orientation of liquid crystal according to an applied signal waveform, modulates emitted light, and visualizes the modulation, a switching element and a switching electrode connected to the switching element that are formed on a first substrate of said paired substrates, an opposing electrode formed on a second substrate, an insulation film formed on said opposing electrode, and a plurality of sub electrodes formed on said insulation film, wherein an image signal is applied to said switching electrode and an image signal is not applied to said sub electrode and said opposing electrode, wherein when an image signal is applied to said switching electrode, a direction of an electric field applied to said liquid crystal varies between a parallel direction and perpendicular direction to said substrate, depending upon whether a potential of said switching electrode is in phase or in opposite phase with a potential of said sub electrode.

2. The liquid crystal display device as defined in claim 1, wherein liquid crystal formed in a gap between a pair of said substrates enters a non-orientation state when no electric field is applied and the liquid crystal enters an orientation state when an electric field is applied.

3. The liquid crystal display device as defined in claim 1, wherein only a single switching element is provided.

4. The liquid crystal display device as defined in claim 1, wherein said liquid crystal is nematic liquid crystal.

5. A displaying method of a liquid crystal display device, said device comprising:

liquid crystal formed in a gap between a pair of substrates including at least a single light-transmitting substrate, an electrode which is formed on said substrate to apply a signal waveform electric field from outside to liquid crystal, a mechanism which varies orientation of liquid crystal according to an applied signal waveform, modulates emitted light, and visualizes the modulation, a switching element and a switching electrode connected to the switching element that are formed on a first substrate of said paired substrates, an opposing electrode formed on a second substrate, an insulation film formed on said opposing electrode, and a plurality of sub electrodes formed on said insulation film, said method comprising the steps of:
preparing said liquid crystal display device, inputting different constant electric signals respectively to said opposing electrode and said sub electrode, and
inputting an electric signal to said switching element, said electric signal changing according to an image signal, and wherein when an image signal is applied to said switching electrode, a direction of an electric field applied to said liquid crystal varies between a parallel direction and perpendicular direction to said substrate, depending upon whether a potential of said switching electrode is in phase or in opposite phase with a potential of said sub electrode.

6. A displaying method of a liquid crystal display device, said device comprising:

liquid crystal formed in a gap between a pair of substrates including at least a single light-transmitting substrate, an electrode which is formed on said substrate to apply a signal waveform electric field from outside to liquid crystal, a mechanism which varies orientation of liquid crystal according to the applied signal waveform, modulates emitted light, and visualizes the modulation, a switching element and a switching electrode connected to the switching element that are formed on a first substrate of said paired substrates, an opposing electrode formed on a second substrate, an insulation film formed on said opposing electrode, and a plurality of sub electrodes formed on said insulation film, said method comprising the steps of:
preparing said liquid crystal display device,
grounding said opposing electrode, applying in-phase voltage to said sub electrodes and said switching electrode so as to provide dark display, and applying voltage with an opposite phase to said sub electrodes and said switching electrode so as to provide bright display, and wherein when an image signal is applied to said switching electrode, a direction of an electric field applied to said liquid crystal varies between a parallel direction and perpendicular direction to said substrate, depending upon whether a potential of said switching electrode is in phase or in opposite phase with a potential of said sub electrode.

7. A liquid crystal display device, comprising:

liquid crystal formed in a gap between a pair of substrates including at least a single light-transmitting substrate, an electrode which is formed on said substrate to apply a signal waveform electric field from outside to liquid crystal, a mechanism which varies orientation of liquid crystal according to the applied signal waveform, modulates emitted light, and visualizes the modulation, a switching element and a resistant film formed on a first substrate of said paired substrates, a switching electrode which is connected to said switching element and an electrode which is not connected to said switching element, formed on said resistant film, and an opposing electrode which is not connected to said switching element formed on a second substrate, wherein an image signal is applied to said switching electrode connected to said switching element while an image signal is not applied to said opposing electrode and said electrode which is not connected to said switching element, wherein when an image signal is applied to said switching electrode connected to said switching element, a direction of an electric field, which is applied to said liquid crystal, is varied between a parallel direction and a perpendicular direction to said substrate, depending upon whether a potential of said switching electrode is in phase or in opposite phase with a potential of said electrode which is not connected to said switching element.

8. The liquid crystal display device as defined in claim 7, wherein liquid crystal formed in a gap between a pair of said substrates enters a non-orientation state when no electric field is applied, and said liquid crystal enters a horizontal orientation, vertical orientation, or intermediate orientation state by applying an electric field in a substantially horizontal direction to said substrate or perpendicularly to a surface of said substrate.

9. The liquid crystal display device as defined in claim 7, wherein only a single switching element is provided.

10. The liquid crystal display device as defined in claim 7, wherein said liquid crystal is nematic liquid crystal.

11. A displaying method of a liquid crystal display device, said device comprising:

liquid crystal formed in a gap between a pair of substrates including at least a single light-transmitting substrate, an electrode which is formed on said substrate to apply a signal waveform electric field from outside to liquid crystal, a mechanism which varies orientation of liquid crystal according to the applied signal waveform, modulates emitted light, and visualizes the modulation, a switching element and a resistant film formed on a first substrate of said paired substrates, a switching electrode, which is connected to said switching element, and a switching electrode, which is not connected to said switching element, formed on said resistant film, and an opposing electrode, which is not connected to said switching element, formed on a second substrate, said method comprising the steps of:
preparing said liquid crystal display device,
applying a signal waveform with an opposite polarity respectively to said electrode which is connected to said switching element and said electrode which is not connected thereto on said first substrate so as to generate an electric field in a substantially horizontal direction to a surface of said substrate between said electrode which is connected to said switching element and said electrode which is not connected thereto, applying a signal waveform with the same polarity respectively to said electrode which is connected to said switching element and said electrode which is not connected thereto on said first substrate so as to generate an electric field vertically to a surface of said substrate between said electrode which is connected to said switching element, said electrode which is not connected thereto, and said resistant film, and said grounded opposing electrode, applying an image signal to said switching electrode connected to said switching element and not applying an image signal to said opposing electrode and said electrode which is not connected to said switching element, and when an image signal is applied to said switching electrode connected to said switching element, varying a direction of an electric field, which is applied to said liquid crystal, between a parallel direction and a perpendicular direction to said substrate, depending upon whether a potential of said switching electrode is in phase or in opposite phase with a potential of said electrode which is not connected to said switching element.

12. A displaying method of a liquid crystal display device, said device comprising:

liquid crystal formed in a gap between a pair of substrates including at least a single light-transmitting substrate, an electrode which is formed on said substrate to apply a signal waveform electric field from outside to liquid crystal, a mechanism which varies orientation of liquid crystal according to the applied signal waveform, modulates emitted light, and visualizes the modulation, a pair of polarizers, a switching element and a resistant film formed on a first substrate of said paired substrates, a switching electrode, which is connected to said switching element, and a switching electrode, which is not connected to said switching element, formed on said resistant film, and an opposing electrode, which is not connected to said switching element, formed on a second substrate, said method comprising the steps of:

preparing said liquid crystal display device, applying a signal waveform with opposite polarity respectively to said electrode which is connected to said switching element and said electrode which is not connected thereto on said first substrate, so that an electric field is generated in a substantially horizontal direction to a surface of said substrate between said electrode which is connected to said switching element and said electrode which is not connected thereto, so as to provide bright display, applying signal waveforms with the same polarity respectively to said electrode which is connected to said switching element and said electrode which is not connected thereto on said first substrate, so that an electric field is generated vertically to a surface of said substrate between said electrode which is connected to said switching element, said electrode which is not connected thereto, and said resistant film, and said grounded opposing electrode, so as to provide dark display, applying an image signal to said switching electrode connected to said switching element and not applying an image signal to said opposing electrode and said electrode which is not connected to said switching element, and when an image signal is applied to said switching electrode connected to said switching element, varying a direction of an electric field, which is applied to said liquid crystal, between a parallel direction and a perpendicular direction to said substrate, depending upon whether a potential of said switching electrode is in phase or in opposite phase with a potential of said electrode which is not connected to said switching element.

13. A liquid crystal display device, comprising:

liquid crystal formed in a gap between a pair of substrates including at least a single light-transmitting substrate, an electrode which is formed on said substrate to apply a signal waveform electric field from outside to liquid crystal, a mechanism which varies orientation of liquid crystal according to the applied signal waveform, modulates emitted light, and visualizes the modulation, a first electrode and a second electrode which are respectively connected to a first switching element and a second switching element, and a third electrode, which is not connected to said switching element, formed on a first substrate of said paired substrates, an insulator, and an opposing electrode, which is not connected to said switching element, formed on said second substrate, said first and third electrodes being opposed to said second electrode via said insulators, wherein an image signal is applied to said first and second electrodes respectively connected to said first and second switching elements while an image signal is not applied to said third electrode and said opposing electrode, wherein when an image signal is applied to said first and second electrodes, a direction of an electric field applied to said liquid crystal varies between a parallel direction and a perpendicular direction to said substrate, depending upon whether a potential of said first and second electrodes is in phase or in opposite phase with a potential of said third electrode.

14. The liquid crystal display device as defined in claim 13, wherein liquid crystal formed in a gap between a pair of said substrates enters a non-orientation state when no electric field is applied, and said liquid crystal enters a horizontal orientation, vertical orientation, or intermediate orientation state by applying an electric field in a substantially horizontal direction to a surface of said substrate or applying an electric field perpendicularly to a surface of said substrate.

15. The liquid crystal display device as defined in claim 13, further comprising liquid crystal formed in a gap between a pair of substrates including at least a single light-transmitting substrate, and an orientation film which is formed between a pair of said substrates so as to sandwich said liquid crystal in vertical orientation when no electric field is applied, wherein said liquid crystal enters a horizontal orientation, vertical orientation, or intermediate orientation state by applying an electric field in a substantially horizontal direction to said substrate or applying an electric field perpendicularly to a surface of said substrate.

16. The liquid crystal display device as defined in claim 13, wherein said liquid crystal is nematic liquid crystal.

17. A displaying method of a liquid crystal display device, said device comprising:

liquid crystal formed in a gap between a pair of substrates including at least a single light-transmitting substrate, an electrode which is formed on said substrate to apply a signal waveform electric field from outside to liquid crystal, a mechanism which varies orientation of liquid crystal according to the applied signal waveform, modulates emitted light, and visualizes the modulation, a first electrode and a second electrode which are respectively connected to a first switching element and a second switching element, and a third electrode which is not connected to said switching element, formed on a first substrate of said paired substrates, an insulator, and an opposing electrode, which is not connected to said switching element, formed on a second substrate, said first and third electrodes being opposed to said second electrode via said insulator, said method comprising the steps of:

preparing said liquid crystal display device, applying a signal waveform with opposite polarity to said first to third electrode so as to generate an electric field in a substantially horizontal direction to a surface of said substrate between said first to third electrodes, applying a signal waveform with the same polarity to said first to third electrodes so as to generate an electric field perpendicularly to a surface of said substrate between said first to third electrodes and said opposing electrode formed on said second substrates, applying an image signal to said first and second electrodes respectively connected to said first and second switching elements and not applying an image signal to said third electrode and said opposing electrode, and when an image signal is applied to said first and second electrodes, varying a direction of an electric field applied to said liquid crystal between a parallel direction and a perpendicular direction to said substrate, depending upon whether a potential of said first and second electrodes is in phase or in opposite phase with a potential of said third electrode.

* * * * *